(12) United States Patent
Houston et al.

(10) Patent No.: US 12,257,864 B2
(45) Date of Patent: Mar. 25, 2025

(54) SECURELY PAIRING A VEHICLE-MOUNTED WIRELESS SENSOR WITH A CENTRAL DEVICE

(71) Applicant: SENSATA TECHNOLOGIES, INC., Attleboro, MA (US)

(72) Inventors: Samuel D. Houston, Antrim (GB); Mark Duffy, Antrim (GB); Samuel K. Strahan, Ballymena (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 219 days.

(21) Appl. No.: 18/005,390

(22) PCT Filed: Aug. 18, 2020

(86) PCT No.: PCT/US2020/046747
§ 371 (c)(1),
(2) Date: Jan. 13, 2023

(87) PCT Pub. No.: WO2022/039719
PCT Pub. Date: Feb. 24, 2022

(65) Prior Publication Data
US 2023/0256780 A1     Aug. 17, 2023

(51) Int. Cl.
*B60C 23/04*     (2006.01)
(52) U.S. Cl.
CPC ...... *B60C 23/0462* (2013.01); *B60C 23/0472* (2013.01); *B60C 23/0479* (2013.01)
(58) Field of Classification Search
CPC ............ B60C 23/0462; B60C 23/0472; B60C 23/0479; B60C 23/0471; B60C 2200/04; H04W 12/069; H04W 12/50

USPC ........................................................ 340/557
See application file for complete search history.

(56) References Cited

U.S. PATENT DOCUMENTS

| | | | |
|---|---|---|---|
| 9,306,924 B2 * | 4/2016 | Lehmann | H04L 63/102 |
| 2008/0018448 A1 * | 1/2008 | Ghabra | B60C 23/0471 |
| | | | 340/447 |
| 2017/0136834 A1 | 5/2017 | Chong et al. | |
| 2020/0207163 A1 | 7/2020 | Schwegler et al. | |

OTHER PUBLICATIONS

International Search Report and Written Opinion, PCT/US2020/046747, Apr. 8, 2021, 9 pages.

* cited by examiner

*Primary Examiner* — Eric Blount
(74) *Attorney, Agent, or Firm* — Mark H. Williams

(57) ABSTRACT

Methods, system, apparatuses, and computer program products for securely pairing a vehicle-mounted wireless sensor with a central device are disclosed. In a particular embodiment, securely pairing a vehicle-mounted wireless sensor with a central device in accordance with the present disclosure includes a vehicle sensor device pairing with a vehicle control system (VCS) using a pre-shared passkey. The pre-shared passkey is shared between the vehicle sensor device and the VCS via an out-of-band exchange. This embodiment also includes the vehicle sensor device transmitting an identifier for a resolvable private address (RPA) to the VCS. In addition, the vehicle sensor device communicates with the VCS using the RPA. In this example embodiment, the RPA is periodically regenerated by the vehicle sensor device.

20 Claims, 14 Drawing Sheets

SECURELY PAIRING A VEHICLE-MOUNTED WIRELESS SENSOR WITH A CENTRAL DEVICE

BACKGROUND

Wireless vehicle sensors, such as wireless tire pressure monitoring system (TPMS) sensors, have been introduced to provide vehicle sensor data to a vehicle control system over a radio frequency (RF) link. In particular, wireless TPMS sensors have been introduced to the majority of car markets across the globe, with many regions having legislation requiring the system for safety or environmental reasons. The system is designed to alert the driver of under inflated tire(s). Current systems, such as TPMS, typically employ a unidirectional RF link from the sensor to the vehicle to transmit key data for the sensing application. This data could include pressure, temperature, position, speed/acceleration, unique ID or stimulus, among others. For example, Tire Fill Assist (TFA) is a TPMS feature that has been implemented using the current unidirectional RF link to the vehicle. This feature allows the vehicle to communicate the status of the TPMS to the user, for example by using the horn and/or lights as feedback.

Bluetooth Low Energy (BLE) is a common short-range wireless standard that may be used for bidirectional communication with a wireless vehicle sensor. However, for many wireless vehicle sensors, it may not be practical to have a user interface for pairing. Allowing a vehicle to automatically learn its sensors during drive cycles is not ideal. This process can take a significant amount of time to complete and is often only run while the vehicle is moving. This results in a period of time where the vehicle is not aware of the sensors fitted and therefore cannot warn for pressure deviations. Thus, there is a need to complete the pairing processes in the factory or other installation sites. However, when there is widespread use of BLE devices in a vehicle, there could be many BLE devices transmitting at one time (e.g., in a tire shop or production line setting), meaning there will be significant cross talk. Thus, knowing which sensor is the intended target for pairing could be very difficult or impossible.

SUMMARY OF INVENTION

Embodiments in accordance with the present disclosure are directed to securely pairing a vehicle-mounted wireless sensor with a central device. To pair the wireless sensor with the vehicle control system in the vehicle assembly plant or other installation site, a pairing tool is used for an out-of-band exchange of a shared passkey. Prior to completing the pairing process, the shared passkey is exchanged between the wireless sensor and the vehicle control system using the pairing tool. In an example embodiment, the vehicle control system generates the passkey and provides the passkey to the pairing tool, which wirelessly transmits the passkey to the wireless sensor. In other embodiments, the passkey may be generated by the wireless sensor or the pairing tool. During the pairing processing, the passkey that is exchanged in-band is compared to the passkey exchanged out-of-band to verify that the correct wireless sensor is being paired with the vehicle control system. Accordingly, a passkey verification mechanism may be implemented in a wireless vehicle sensor without the need for a physical interface or display on the wireless sensor device. The passkey verification allows the vehicle control system to distinctly identify the device that is the target for pairing.

To pair the wireless sensor with a wireless mobile device (e.g., a user's smart phone, tablet, smart watch, etc.), the vehicle control system is used to facilitate the exchange of identity information between the wireless sensor and the mobile device. The mobile device, having already paired with the vehicle, may request the vehicle control system to provide identity information for pairing with the wireless sensor. The vehicle control system may provide the identity information needed for the mobile device to initiate the pairing process directly with the wireless sensor. The vehicle control system may also provide identity information to the wireless sensor such that the wireless sensor may be configured with a permitted device list (e.g., a whitelist) for filtering connection requests from devices. Accordingly, identity credentials for pairing the wireless sensor device to a user's smart device may be shared through the vehicle control system that has already paired with each device.

In a particular embodiment, securely pairing a vehicle-mounted wireless sensor with a central device in accordance with the present disclosure includes a vehicle sensor device pairing with a vehicle control system (VCS) using a pre-shared passkey. The pre-shared passkey is shared between the vehicle sensor device and the VCS via an out-of-band exchange. This embodiment also includes the vehicle sensor device transmitting an identifier such as an identity resolving key (IRK) for a resolvable private address (RPA) to the VCS. In addition, the vehicle sensor device communicates with the VCS using the RPA, such that the VCS may resolve the address of the vehicle sensor device using the identifier. In this example embodiment, the RPA is periodically regenerated by the vehicle sensor device.

In another embodiment, securely pairing a vehicle-mounted wireless sensor with a central device in accordance with the present disclosure includes a vehicle control system (VCS) pairing with a wireless vehicle sensor device using a pre-shared passkey, which is shared between the vehicle sensor device and the VCS via an out-of-band exchange. In this example embodiment, the VCS receives an identifier such as an identity resolving key (IRK) for the vehicle sensor device, associates the identifier with a sensor identifier of the vehicle sensor device, receives a packet identified by a resolvable private address (RPA) from the vehicle sensor device, and identifies the vehicle sensor device based on the RPA using the identifier.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DESCRIPTION OF EMBODIMENTS

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1A:
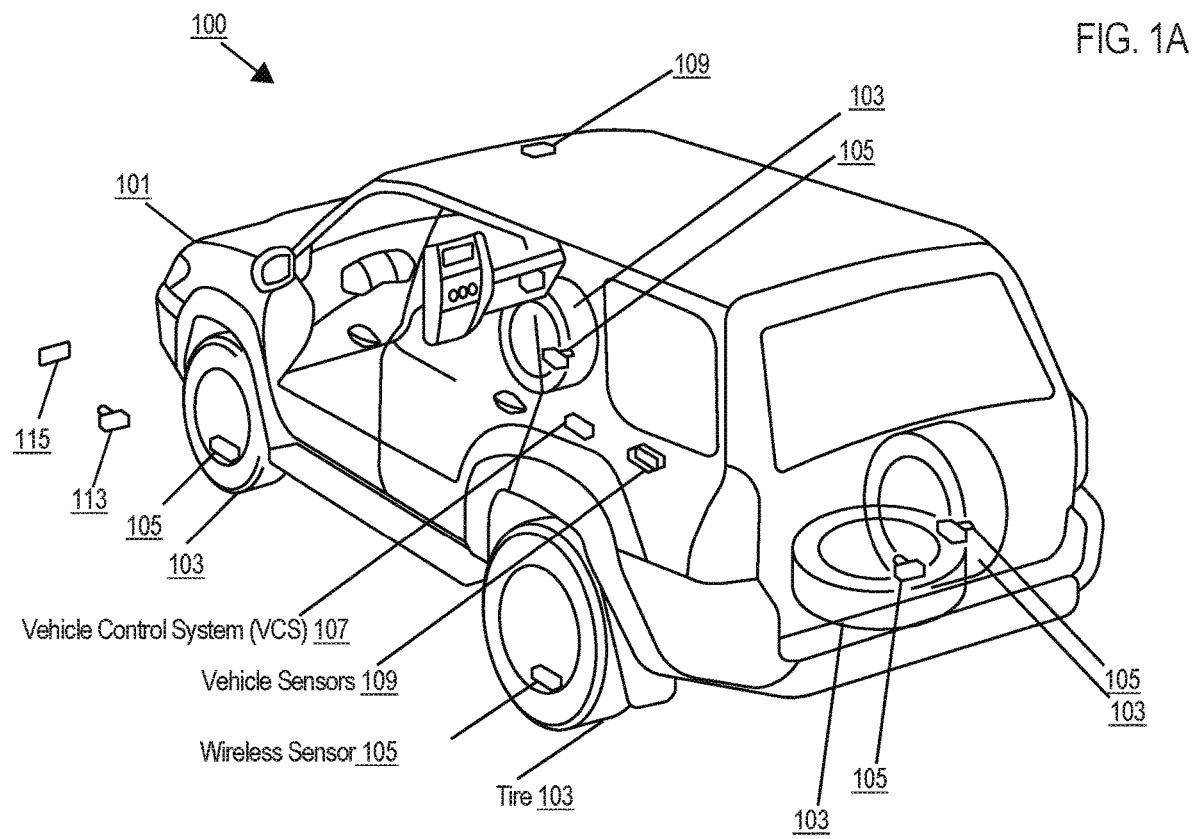
FIG. 1A sets forth an isometric diagram of a system for securely pairing a vehicle-mounted wireless sensor with a central device in accordance with the present disclosure.
Figure 1B:
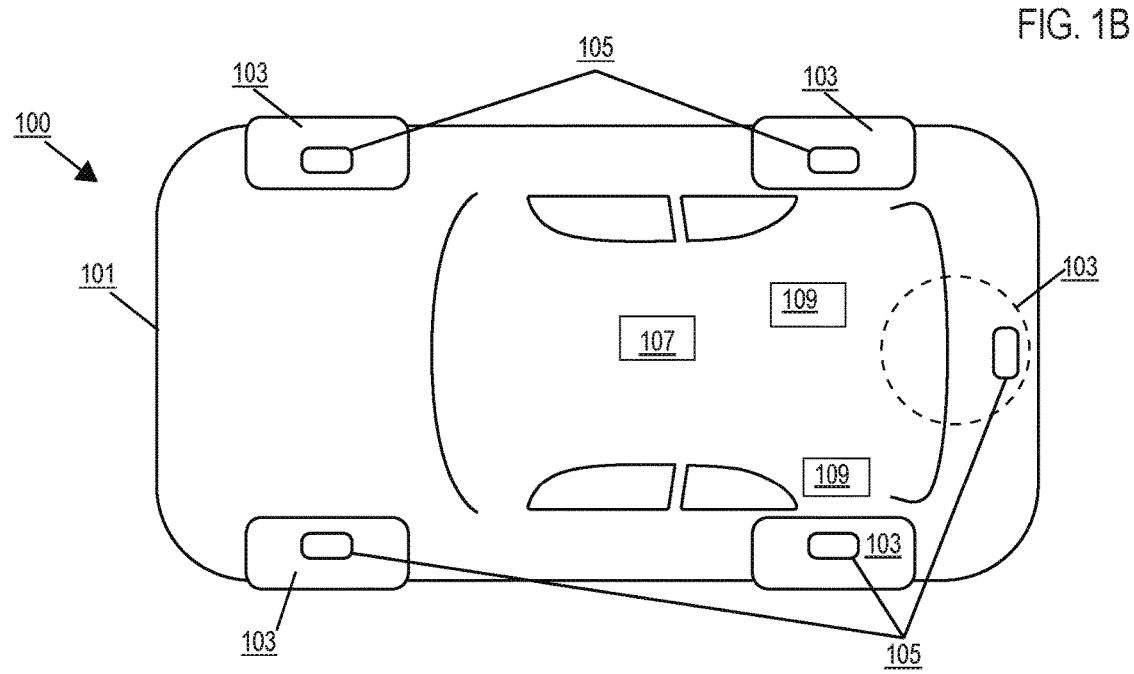
FIG. 1B sets forth a top view of the system of FIG. 1A.

Exemplary methods, apparatuses, and computer program products for securely pairing a vehicle-mounted wireless sensor with a central device in accordance with the present disclosure are described with reference to the accompanying drawings, beginning with FIG. 1A and FIG. 1B. FIG. 1A sets forth an isometric diagram of a system (100) for securely pairing a vehicle-mounted wireless sensor with a central device in accordance with the present disclosure. FIG. 1B sets forth a top view of the system of FIG. 1A. The system of FIGS. 1A and 1B includes a vehicle (101) equipped with tires (103) and a wireless vehicle sensor device (105). While the embodiment of FIGS. 1A and 1B shows the wireless vehicle sensor device is a tire monitoring device (e.g., a TPMS sensor) for the tire (103), it will be appreciated that the wireless vehicle sensor device (105) may be any vehicle sensor device that is configured for wireless communication, including but not limited to brake pad wear sensors, seat buckle sensors, and other wireless automotive sensors (109). In a particular embodiment, the wireless vehicle sensor device (105) may be a tire pressure monitoring system (TPMS) sensor, and measures operational characteristics of the tire, such as tire pressure, tire temperature, and motion characteristics, and communicates the collected data to a vehicle control system (VCS) (107).

The VCS (107) controls various components and systems within a vehicle. For example, the VCS (107) may include a plurality of electronic control units (ECUs) that are configured to control one or more vehicle subsystems. Commonly referred to as the vehicle's "computers", an ECU may be a central control unit or may refer collectively to one or more vehicle subsystem control units. In a particular embodiment, one of the subsystems in the VCS (107) is a TPMS that receives tire pressure and other measurements from the wireless vehicle sensor device (105). Other subsystems may include an Engine Control Module (ECM), a Powertrain Control Module (PCM), a Transmission Control Module (TCM), a Body Control Module (BCM), a Central Timing Module (CTM), a General Electronic Module (GEM), a Remote Keyless Entry Module, and/or a Suspension Control Module (SCM). In an embodiment according to the present disclosure, the VCS (107) includes a BCM that includes an Antilock Braking System (ABS) and an Electronic Stability Program (ESP). Alternatively, the VCS (107) may comprise a Telematics Control Unit (TCU) independent of vehicle-based sensors (e.g., an aftermarket system).

The wireless vehicle sensor device (105) may be equipped with a wireless transceiver for bidirectional wireless communication with the VCS (107), as will be described in more detail below. The VCS (107) may be similarly equipped with a wireless transceiver for bidirectional wireless communication with each wireless vehicle sensor device (105), as will be described in more detail below. The bidirectional wireless communication may be realized by communication technology such as Bluetooth Low Energy, Bluetooth Smart, or other low power bidirectional communication technology that is intended to conserve energy consumed. Alternatively, the wireless vehicle sensor device (105) may include a unidirectional transmitter configured to transmit signals to the VCS (107).

The wireless vehicle sensor device (105) may be identifiable by a unique identification code, also referred to herein as a sensor identifier (ID). For example, the sensor ID may be a Media Access Control (MAC) address of the wireless vehicle sensor device (105) or a communication component thereof. As another example, the sensor ID may be a name, serial number or other unique identifier. The sensor ID may be included in each transmission frame, or may be associated with a particular transmission channel. However, when the vehicle sensor device (105) is installed on the vehicle (101) (e.g., in a vehicle assembly line or at a dealership), the wireless vehicle sensor device (105) must first be paired with the VCS (107). In a production environment, there may be many wireless sensors that advertising their respective sensor IDs, and the VCS (107) must be able to correlate advertised sensor IDs to a specific wireless sensor. In one example of a conventional Bluetooth pairing process, a Generic Access Profile (GAP) central device might generate an access code that is either displayed on a screen of the pairing device and confirmed by a human technician, or manually entered into a physical interface of the pairing device by a human technician. However, an automotive sensor may not have a display for displaying the access code or physical interface for entering an access code due to the compact size and embedded nature of automotive sensors. In a particular embodiment in accordance with the present disclosure, a wireless pairing tool (113), such as a handheld device or assembly line station, is used to facilitate on out-of-band exchange of a share passkey between the wireless vehicle sensor device (105) and the VCS (107), as will be explained in detail below.

After the vehicle (101) comes into the possession of an owner, a user (e.g., the owner or a repair technician) may wish to initiate bidirectional communication directly with the wireless vehicle sensor device (105) using the user's wireless device (115) (e.g., a smartphone). Direct communication with the wireless vehicle sensor may be advantageous, for example, when the wireless vehicle sensor device (105) is a TPMS sensor configured to transmit tire fill assist (TFA) data. However, to pair with the wireless vehicle sensor device (105) with the user's wireless device (115), the user's wireless device (115) must also be able to identify the specific wireless vehicle sensor device (105). This identification process may be difficult due to cross talk among other vehicle sensors, and also due to security protocols implemented by the wireless vehicle sensor device (105). In a particular embodiment in accordance with the present disclosure, the VCS (107) facilitates exchange of identification credentials between the wireless vehicle sensor device (105) and the user's wireless device (115), as will be explained in detail below.

The arrangement of devices making up the exemplary system illustrated in FIG. 1A and FIG. 1B are for explanation, not for limitation. Data processing systems useful according to various embodiments of the present disclosure may include additional servers, routers, other devices, and peer-to-peer architectures, not shown in FIG. 1A and FIG. 1B, as will occur to those of skill in the art. The devices of FIG. 1A and FIG. 1B and other data processing systems may utilize communications protocols in accordance with embodiments of the present disclosure, including but not limited to TCP (Transmission Control Protocol), IP (Internet Protocol), Bluetooth protocol, Near Field Communication, Controller Area Network (CAN) protocol, Local Interconnect Network (LIN) protocol, Serial Peripheral Interface (SPI) protocol, FlexRay protocol, and others as will occur to those of skill in the art. Various embodiments of the present disclosure may be implemented on a variety of hardware platforms in addition to those illustrated in FIG. 1A and FIG. 1B.

Figure 2:
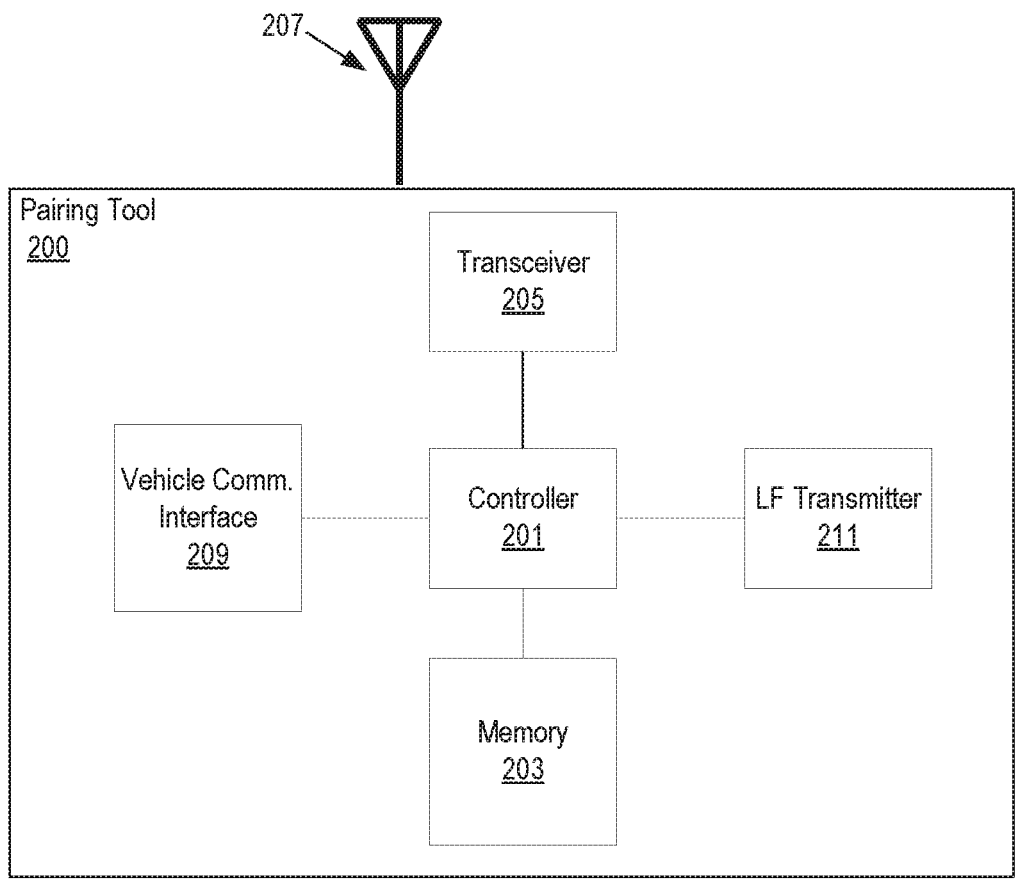
FIG. 2 sets forth a block diagram of an exemplary pairing tool in accordance with the present disclosure.

For further explanation, FIG. 2 sets forth a diagram of an exemplary implementation of a pairing tool (200) for securely pairing a vehicle-mounted wireless sensor with a central device according to embodiments of the present disclosure. The pairing tool (200) of FIG. 2 may include a controller (201), a memory (203), a transceiver (205), an antenna (207), and a vehicle communications bus interface (209). In some embodiments, the pairing tool (200) may also include a low frequency transmitter (211) configured to transmit a wake-up signal (e.g., a 125 kHz exciter signal for a low frequency system of a wireless vehicle sensor device).

Figure 3:
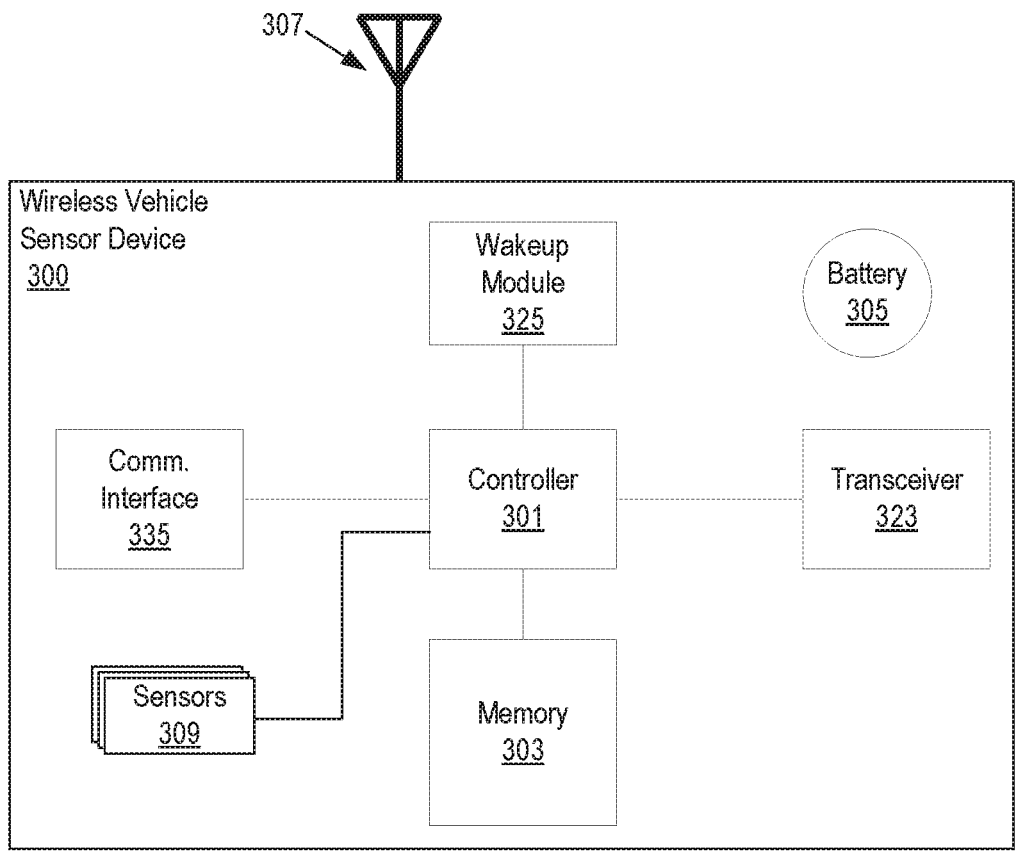
FIG. 3 sets forth a block diagram of an exemplary wireless vehicle sensor device in accordance with the present disclosure.
Figure 4:
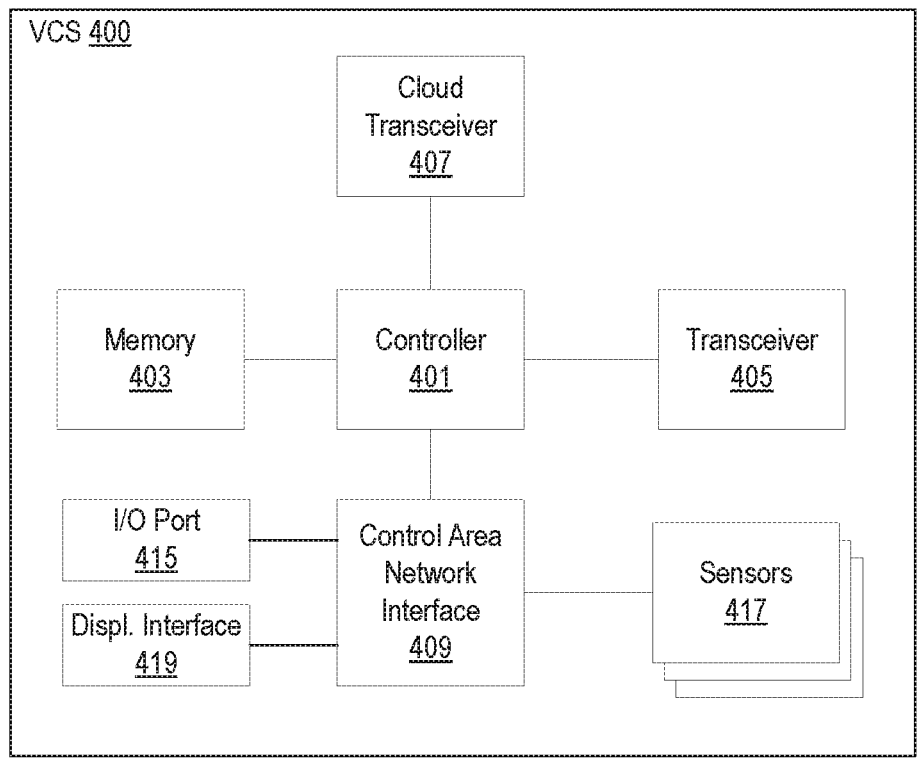
FIG. 4 sets forth a block diagram of an exemplary vehicle control system in accordance with the present disclosure.

The controller (201) of the pairing tool (200) may be configured to facilitate the exchange of a shared passkey between a wireless vehicle sensor device (e.g., the wireless vehicle sensor device (300) of FIG. 3) and a VCS (e.g., the VCS (400) of the FIG. 4), and may comprise a suitably programmed processor, for example a dedicated microprocessor or a microcontroller, or other programmable processing device. Standard components such as random access memory (RAM), an analog-to-digital converter (ADC), an input/output (I/O) interface, a clock, and a central microprocessor (all not shown) may be provided, the components typically being integrated onto a single chip. Alternatively or additionally, a custom microcontroller such as an Application Specific Integrated Circuit (ASIC), a digital signal processor (DSP), a programmable logic array (PLA) such as a field programmable gate array (FPGA), or other data computation unit in accordance with the present disclosure may be used. For example, the shared passkey may be a randomly generated code or sequential code that is used to identify a wireless vehicle sensor among multiple wireless vehicle sensors, and may be generated by any of the pairing tool (200), the wireless vehicle sensor, or the VCS. As another example, the shared passkey may be a VCS security parameter.

The controller (201) of the pairing tool (200) may be configured to send the shared passkey to the VCS when the passkey is generated by the pairing tool (200) or the wireless vehicle sensor device. The controller (201) of the pairing tool may also be configured to send the shared passkey to the wireless sensor device when the passkey is generated by the pairing tool (200) or the VCS, or is a security parameter of the VCS. In a particular embodiment, the controller (201) of the pairing tool (200) may receive the passkey from the VCS via the transceiver (205) or the vehicle communications bus interface (209), and may store the passkey in the memory (203). The controller (201) of the pairing tool (200) may then send the passkey to the wireless vehicle sensor via the transceiver (205).

The transceiver (205) of the pairing tool may be coupled to the controller (201) and the antenna (207), and may be configured for bidirectional wireless communication with the wireless sensor device and, in some embodiments, the VCS. For example, once the transceiver is configured for communication with the VCS, the transceiver may be used to transmit tire parameters (e.g., tire pressure) to the VCS and receive vehicle parameters and configuration parameters from the VCS. The transceiver (233) may be configured to communicate a sensor ID to a remote device such as an activation tool or activation station in an assembly line. The transceiver (205) may be configured for operation within a particular RF band, such as the Industrial, Scientific and Medical (ISM) 2.4 GHz band with a frequency range of 2.4 GHz to 2.5 GHz that includes an unlicensed portion of the RF spectrum. In a particular embodiment, the transceiver (205) may be a Bluetooth protocol transceiver, such as a Bluetooth Low Energy transceiver or a Bluetooth Smart transceiver, operating between 2.4 GHz and 2.4835 GHz. In an embodiment, the transceiver (205) may be further configured to transmit a 2.4 GHz band wake-up signal to a low power receiver of the wireless sensor device to transition the wireless sensor device from a standby state to an active state where a transceiver of the wireless sensor device is brought online.

For further explanation, FIG. 3 sets forth a diagram of an exemplary implementation of a wireless vehicle sensor device (300) for securely pairing a vehicle-mounted wireless sensor with a central device according to embodiments of the present disclosure. The wireless vehicle sensor device (300) of FIG. 3 may include a controller (301), a memory (303), a battery (305), a transceiver (323), a wakeup module (325), and an antenna (307). In a particular embodiment, the wireless vehicle sensor device may be a tire monitoring device and may include one or more sensors (309), such as a pressure sensor (e.g. a piezo resistive transducer or a piezoelectric or capacitance based pressure sensor for measuring air pressure in a respective tire), a temperature sensor, and a motion sensor (e.g., an accelerometer responsive to acceleration and/or changes in acceleration experienced during rotation of a respective tire).

The controller (301) of the wireless vehicle device (300) may be configured to pair the wireless vehicle device (300) with a VCS (e.g., the VCS (400) of FIG. 4) and to provide sensor data (e.g., tire pressure, brake pad wear, etc.) to the VCS. The controller (301) of the wireless vehicle device (300) may be configured to communicate with a pairing tool (e.g., the pairing tool (200) of FIG. 2) to send or receive a shared passkey for pairing with the VCS, as will be explained below. The controller (301) of the wireless vehicle device (300) may also be configured to pair with a user device (e.g., a smart phone) and to provide sensor data (e.g., tire fill assist data) to the user device, as will be explained below. The controller (301) of the wireless vehicle device (300) may comprise a suitably programmed processor, for example a dedicated microprocessor or a microcontroller, or other programmable processing device. Standard components such as random access memory (RAM), an analog-to-digital converter (ADC), an input/output (I/O) interface, a clock, and a central microprocessor (all not shown) may be provided with the components typically being integrated onto a single chip. Alternatively or additionally, a custom microcontroller such as an Application Specific Integrated Circuit (ASIC), a digital signal processor (DSP), a programmable logic array (PLA) such as a field programmable gate array (FPGA), or other data computation unit in accordance with the present disclosure may be used.

The transceiver (323) of the wireless vehicle sensor device (300) may be coupled to the controller (301) and the antenna (307), and may be configured for bidirectional wireless communication with other wireless modules, including but not limited to the VCS, a wireless pairing tool, and a user device (e.g., a smartphone). For example, to pair with the VCS, the transceiver (323) and the wakeup module (325) may be used to communicate with the wireless pairing tool to send or receive a shared passkey as part of an out-of-band exchange of the shared passkey. As another example, the transceiver (323) may be used to share identity information with the VCS during the pairing process. As yet another example, once the transceiver (323) is paired with a wireless transceiver of the VCS, the transceiver (323) may be used to transmit sensor data (e.g., tire pressure) to the VCS and receive vehicle-provided parameters (e.g., identity information for credentialed devices) and configuration parameters from the VCS. As yet another example, once the transceiver (323) has received identity information for a credentialed device, the transceiver (323) may be used to communicate with the credentialed device such as the user device.

The transceiver (323) may be configured for operation within a particular RF band, such as the ISM 2.4 GHz band with a frequency range of 2.4 GHz to 2.5 GHz that includes an unlicensed portion of the RF spectrum. In a particular embodiment, the transceiver (323) may be a Bluetooth protocol transceiver, such as a Bluetooth Low Energy transceiver or a Bluetooth Smart transceiver, operating between 2.4 GHz and 2.4835 GHz. In other embodiments, the transceiver (323) may be other types of low power radio frequency communication technology that is intended to conserve energy consumed in the tire monitor device.

The wakeup module (325) may be configured to receive an activation signal from the wireless pairing tool or other remote device. In an embodiment, the wakeup module may be a low frequency (LF) system comprising an LF coil with associated tuning capacitors, an LF amplifier circuity, and a decoding circuit (all not shown). The LF system may detect a signal (e.g., 125 kHz signal) from the remote device via the LF coil and provides a wakeup signal to the controller (301). In another embodiment, the wakeup module (325) may be a low power receiver configured to receive an activation signal from the wireless pairing tool or other remote device and provide a wakeup signal to the controller (301). The low power receiver may be configured for communication within the same RF band as the transceiver (323) (i.e., the ISM 2.4 GHz band with a frequency range of 2.4 GHz to 2.5 GHz). As such, remote devices such as the pairing tool or an activation station in an assembly line may communicate an activation signal to the low power receiver using the same transceiver used by the remote device to communicate with other sensors and devices (e.g., other Bluetooth protocol sensors). As such, a separate activation system, such as an LF system, is not required to activate the wireless vehicle sensor device (300).

The memory (305) may be a non-volatile memory (e.g., flash memory) that stores sensor data, configuration parameters, security credentials, and/or a local identifier such as an identity resolving key (IRK). The memory (305) may also store a data structure embodying a permitted device list indicating a list of sensor IDs from which a connection request may be accepted. For example, the permitted device list may include devices that the VCS has credentialed. The permitted device list may also store a peer IRK for each sensor ID.

The wireless vehicle sensor device (300) may also include a communications interface (335) for organizing data according to communications protocols for transmitting and receiving data via the transceiver (323). For example, the communications interface (335) may encapsulate data in packets in accordance with the Bluetooth protocol. The wireless vehicle sensor device (300) may also include a power interface (not shown) for supplying power received from the battery (305) to the various components of the wireless vehicle sensor device (300).

The battery (305) may provide power to the power interface of the wireless vehicle sensor device (300). However, it is also contemplated that other power sources may be used (e.g., thermoelectric or piezoelectric generators, electromagnetic induction device, and/or other energy harvesters) instead of or in addition to the battery (305).

The antenna (307) may be used by the wireless vehicle sensor device (300) to transmit and receive RF signals. The antenna (307) may be coupled to the transceiver (323) for transmitting and receiving RF signals. The antenna (307)

may also be coupled to the wakeup module (325) for receiving an RF activation signal.

In a particular embodiment, the wireless vehicle sensor device (300) may be installed on the vehicle at a vehicle dealership, a tire dealership, a repair shop, or a vehicle OEM assembly line. At the time of activation and installation of the wireless vehicle sensor device (300) on or within the vehicle, the wireless vehicle sensor device (300) has not yet been paired with the VCS of the vehicle. To pair with the VCS, the wireless vehicle sensor device (300) may transmit a pre-shared passkey to a wireless transceiver of the VCS along with the sensor ID of the wireless vehicle sensor device (300). The pre-shared passkey may be transmitted during one or more communication frames sent from the wireless vehicle sensor device (300) to the VCS, and may also be included in subsequent packets. The VCS may then use the pre-shared passkey to identify the wireless vehicle sensor device (300), and associate the sensor ID (e.g., MAC address) of the wireless vehicle sensor device (300) with the identity of the sensor.

To facilitate the sharing of the pre-shared passkey in advance of pairing, the wireless vehicle sensor device (300) may be configured to send or receive the pre-shared passkey from a wireless pairing tool (e.g., the pairing tool (200) of FIG. 2). For example, the shared passkey may be a randomly generated code or sequential code that is used to identify a wireless vehicle sensor device (300) among multiple wireless vehicle sensors, and may be generated by any of the pairing tool, the wireless vehicle sensor device (300), or the VCS. As another example, the shared passkey may be a VCS security parameter. The controller (301) of the wireless vehicle sensor device (300) may be configured to send the shared passkey to the pairing tool when the passkey is generated by the wireless vehicle sensor device (300). The controller (301) of the wireless vehicle sensor device (300) may also be configured to receive the shared passkey from the pairing tool when the passkey is generated by the pairing tool or the VCS, or is a security parameter of the VCS.

In a particular embodiment, the controller (301) of the wireless vehicle sensor device (300) may receive a shared passkey generated by the VCS from the pairing tool via the transceiver (323) or the wakeup module (325). That is, the VCS may generate the shared passkey and may provide the shared passkey to the pairing tool via a wired or wireless vehicle communications bus interface with the pairing tool, and the pairing tool may wirelessly transmit the shared passkey to the transceiver (323) or the wakeup module (325) of the wireless vehicle sensor device (300). The controller (301) may store the shared passkey generated by the VCS and received from the pairing tool in the memory (303) of the wireless vehicle sensor device (300). To pair the wireless vehicle sensor device (300) with the VCS, the wireless vehicle sensor device (300) may transmit the shared passkey in a packet including with the sensor ID of the wireless vehicle sensor device (300) to the VCS.

To enhance privacy, the controller (301) of the wireless vehicle sensor device (300) may also be configured to generate a resolvable private address (RPA) and transmit communication packets using the RPA in place of the sensor ID. The RPA may be generated based on a random number and secret identity resolving key (IRK). The IRK may be provided by the wireless vehicle sensor device (300) to the VCS as part of the pairing process such that the VCS may recognize the wireless vehicle sensor device (300) by decoding the RPA using the IRK to ascertain the sensor ID. Accordingly, the wireless vehicle sensor device (300) may periodically regenerate an RPA that may be decoded by the VCS while avoiding tracking of the wireless vehicle sensor device (300) by an unauthorized device.

To pair the wireless vehicle sensor device (300) with an external wireless device (e.g., a user's smartphone) that is not part of the VCS, the external wireless device must also have the IRK to identify the wireless vehicle sensor device (300) based on the advertised RPA. Further, the wireless vehicle sensor device (300) may be configured to deny connection requests from unpermitted or unidentified devices, and thus may only permit a connection request from a device that has been added to a permitted device list. The controller (301) of the wireless vehicle sensor device (300) may be configured to receive identity credentials for an external wireless device from the VCS and store the identity credentials on a permitted devices list in the memory (303). For example, the received identity credentials may be the device ID of the external wireless device, and an IRK of the external wireless device if it implements RPA. Subsequently, upon receiving a connection request from the external wireless device, the controller (301) of the wireless vehicle sensor device (300) may be configured to determine, based on the sensor ID and the permitted device list, that the external wireless device making the request is a permitted device. In response to determining that the requesting device is a permitted device, the controller (301) of wireless vehicle sensor device (300) may be configured to accept the connection request and pair with the external wireless device.

For further explanation, FIG. 4 sets forth a diagram of an exemplary vehicle control system (VCS) (400) for securely pairing a vehicle-mounted wireless sensor with a central device according to embodiments of the present disclosure. The VCS (400) includes a VCS controller (401) coupled to a memory (403) and a transceiver (405). The VCS controller (401) may be configured to obtain sensor readings related to vehicle operating conditions (e.g., from the wireless vehicle sensor device (300) of FIG. 3). The VCS controller (401) may be further configured to communicate with a pairing tool (e.g., the pairing tool (200) of FIG. 2) to send or receive a shared passkey for pairing with the wireless vehicle sensor device, as will be explained below. The controller (401) of the VCS (400) may also be configured to pair with an external user device (e.g., a smart phone) and to facilitate the exchange of identity credentials between the external user device and the wireless vehicle sensor device, as will explained below. For example, the controller (401) may provide, via the transceiver (405), a configuration parameter to the wireless vehicle sensor device for adding the external wireless device to a permitted device list, and the controller (401) may provide, via the transceiver (405), identity information for the wireless vehicle sensor device to the external wireless device. The VCS controller (401) may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The sensor readings and data received from the wireless vehicle sensor device, may be stored in the memory (403). The memory (403) may be a non-volatile memory such as flash memory. For example, the VCS (400) may obtain vehicle operating condition data such as sensor readings from sensors on-board the vehicle and/or vehicle tires.

For bidirectional wireless communication with a wireless vehicle sensor device, the pairing tool, and the external wireless device, the VCS (400) may include a transceiver (405) coupled to the VCS controller (401). For example, to pair with the wireless vehicle sensor device, the transceiver (405) may be used to communicate with the wireless pairing tool to send or receive a shared passkey. As another example, once the transceiver (405) is paired with a wireless transceiver of the wireless vehicle sensor device, the transceiver (405) may be used to receive sensor parameters (e.g., tire pressure) from the wireless vehicle sensor device, and to transmit configuration parameters (e.g., identity information for credentialed devices) to the wireless vehicle sensor device. As yet another example, the transceiver (405) may be used to receive a request from the external wireless device to pair with the wireless vehicle sensor device and to transmit an IRK for connecting to the wireless vehicle sensor device to the external wireless device.

The transceiver (405) may be configured for operation within a particular RF band, such as the ISM 2.4 GHz band with a frequency range of 2.4 GHz to 2.5 GHz that includes an unlicensed portion of the RF spectrum. In one embodiment, the transceiver (405) may be a Bluetooth protocol transceiver. The VCS (400) may further include a cloud transceiver (407) for cellular terrestrial communication, satellite communication, or both. For example, the cloud transceiver (407) may be used to communicate tire parameters (e.g., tire pressure) to a remote server. The cloud transceiver (407) may also be used to receive configuration parameters for the vehicle.

The VCS (400) may further comprise a controller area network (CAN) interface (409) for communicatively coupling vehicle sensors (417) and devices to the controller (401), such as wheel speed sensors, a yaw rate sensor, an inclination sensor, and other sensors, to the controller (401). The CAN interface (409) may couple an I/O port (415) to the controller (401). The port (415) may be used to send or receive a shared passkey. For example, a pairing tool may connect to the port for input or output of the shared passkey. The CAN interface (409) may also couple a display interface (419) to the controller (401). The display interface (419) may be used to output indicia of vehicle sensor parameters (e.g., tire pressure parameters) to a dashboard or display of the vehicle. For example, the display port may be used to output tire pressure indicia to the dashboard or display to warn the driver about low tire pressure detected in a tire by a tire monitor device.

In a particular embodiment, to pair with wireless vehicle sensor device, the VCS (400) may receive a pre-shared passkey from the wireless transceiver of the wireless vehicle sensor device (e.g., the wireless vehicle sensor device (300) of FIG. 3) in association with the unique sensor ID of the wireless vehicle sensor device. The pre-shared passkey may be transmitted during the initial communication packet(s) sent from the wireless vehicle sensor device to the VCS (400) and may also be included in subsequent packets. The VCS (400) may compare the local instance of the pre-shared key to the instance of the pre-shared key received from the wireless vehicle sensor device to verify the identity of the wireless vehicle sensor device, and may store the sensor ID of the wireless vehicle sensor device in the memory (403).

To facilitate the sharing of the pre-shared passkey in advance of pairing, the VCS (400) may be configured to send or receive the pre-shared passkey from a wireless pairing tool (e.g., the pairing tool (200) of FIG. 2). For example, the shared passkey may be a randomly generated code or sequential code that is used to identify a wireless vehicle sensor device among multiple wireless vehicle sensors, and may be generated by any of the pairing tool, the wireless vehicle sensor device, or the VCS (400). As another example, the shared passkey may be a VCS security parameter. The controller (401) of the VCS (400) may be configured to send the shared passkey to the pairing tool when the passkey is generated by the VCS (400). The controller (401) of the VCS (400) may also be configured to receive the shared passkey from the pairing tool when the passkey is generated by the pairing tool or the wireless vehicle sensor device.

In a particular embodiment, the controller (401) of the VCS (400) may receive a passkey and/or may transmit the passkey to the pairing tool via the transceiver (405) or the CAN interface (409). That is, the controller (401) of the VCS (400) may generate the shared passkey and provide the shared passkey to the pairing tool via a wireless (e.g., Bluetooth) or wired connection, and the pairing tool wirelessly transmits the shared passkey to the transceiver of the wireless vehicle sensor device. Subsequently, the controller (401) of the VCS (400) may receive the shared passkey from the wireless vehicle sensor device in a packet that includes the sensor ID.

To enhance privacy, the controller (401) of the VCS (400) may also be configured to receive an IRK of the wireless vehicle sensor device and associate the IRK with the sensor ID in a data structure stored in the memory (405). When a packet transmitted using an RPA is received by the controller (401), the RPA may be resolved using the IRK to ascertain the sensor ID of the wireless vehicle sensor device that transmitted the packet.

To facilitate the pairing of a wireless vehicle sensor device with an external wireless device (e.g., a user's smartphone) that is not part of the VCS (400), the controller (401) of the VCS (400) may be configured to receive, via the transmitter (405), a request for connection to the wireless vehicle sensor device from the external wireless device, and to provide the external wireless device with the sensor ID of the wireless vehicle sensor device acquired during pairing with the wireless vehicle sensor device. The controller (401) may also provide the IRK of the wireless vehicle sensor device to the external wireless device. The controller (401) of the VCS (400) may also be configured to transmit identity credentials of the external wireless device to the wireless vehicle sensor device for addition to a permitted device list maintained on the wireless vehicle sensor device. For example, the controller (401), via the transceiver (405), may transmit the device ID (e.g., MAC address) of the external wireless device as well as an IRK of the external wireless device if it implements an RPA.

Figure 5:
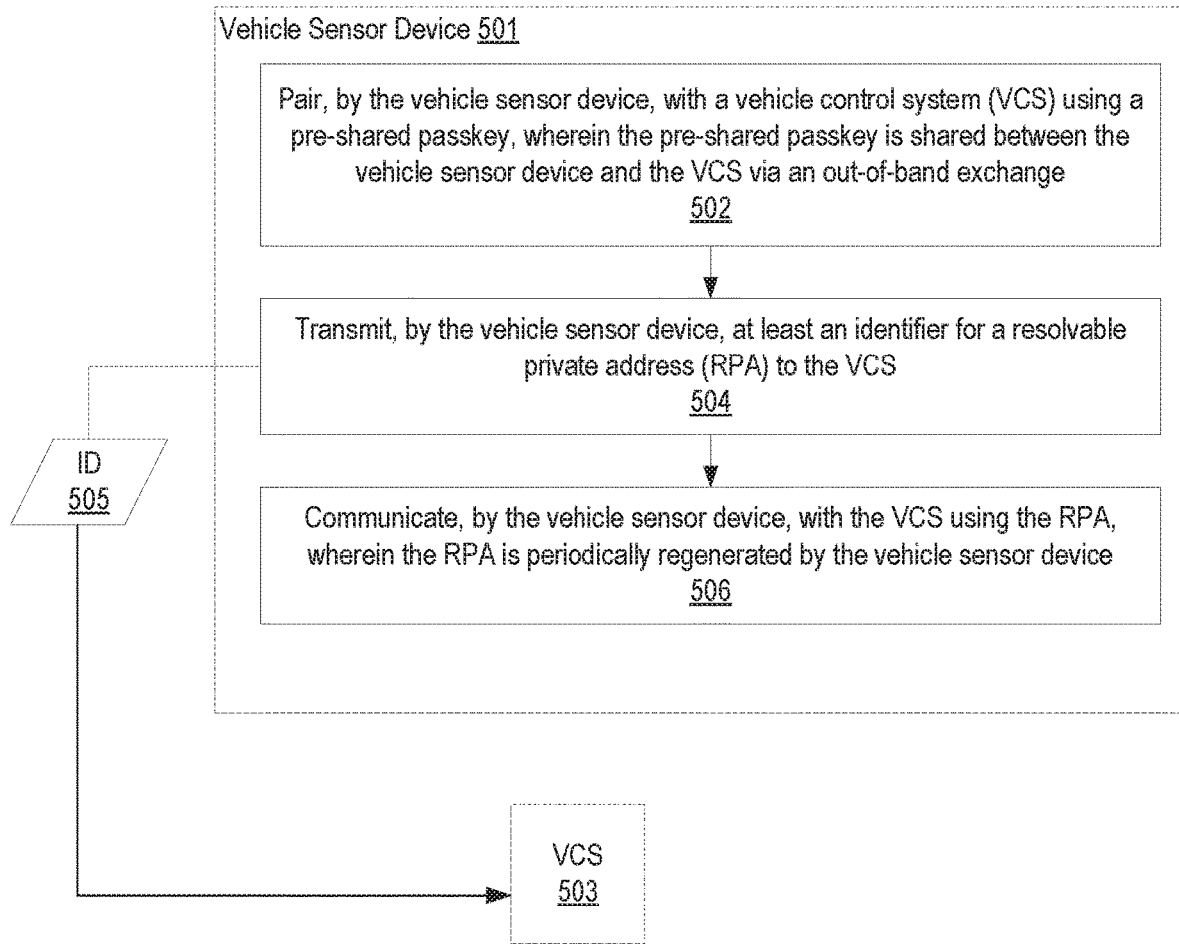
FIG. 5 sets forth a flowchart of an example method for securely pairing a vehicle-mounted wireless sensor with a central device in accordance with the present disclosure.

For further explanation, FIG. 5 sets forth a flow chart illustrating an exemplary method for securely pairing a vehicle-mounted wireless sensor with a central device according to embodiments of the present disclosure that includes pairing (502), by the vehicle sensor device (501), with a vehicle control system (VCS) (503) using a pre-shared passkey, wherein the pre-shared passkey is shared between the vehicle sensor device and the VCS (503) via an out-of-band exchange. Pairing (502), by the vehicle sensor device (501) (e.g., the vehicle sensor device (300) of FIG. 2), with a vehicle control system (VCS) (503) (e.g., the VCS (400) of FIG. 4) using a pre-shared passkey, wherein the pre-shared passkey is shared between the vehicle sensor device and the VCS (503) via an out-of-band exchange may be carried out by the vehicle sensor device (501) and the VCS (503) exchanging a pre-shared passkey via an external device that is configured for communication with both the vehicle sensor device (501) and the VCS (503). For example, before communication is initiated between the vehicle sensor device (501) the VCS (503), a device that is not a component of the vehicle may distribute the pre-shared passkey via a wireless connection to the vehicle sensor device (501) and a wired or wireless connection to the VCS (503).

The exchange of the pre-shared passkey is out-of-band in that the passkey must be provided to the target pairing device outside of a communication channel between the vehicle sensor device (501) and the VCS (503). For example, a pairing tool may communicate with the vehicle sensor device (501) via a wireless out-of-band connection, and the same pairing tool may communicate with the VCS (503) via a wireless interface (e.g., Bluetooth), or via a different type of wireless interface (e.g., WiFi), or via a wired connection to the vehicle communication bus or CAN interface. In a particular embodiment, the vehicle sensor device (501) may include a BLE transceiver that is paired with a BLE transceiver coupled to the VCS (503). The pre-shared passkey may be a randomly generated code (e.g., a 16 bit integer) or a security parameter.

The method of FIG. 5 also includes transmitting (504), by the vehicle sensor device (501), at least an identifier (e.g., an identity resolving key (IRK)) (505) for a resolvable private address (RPA) to the VCS (503). Transmitting (504), by the vehicle sensor device (501), at least the ID (505) for a resolvable private address (RPA) to the VCS (503) may be carried out by the vehicle sensor device (501) transmitting a packet containing the IRK to the VCS (503). The IRK may be used by the VCS (503) to compute a hash of the RPA using the IRK and an encryption function to resolve the sensor ID of the vehicle sensor device (503). The IRK may be programmed into the vehicle sensor device (501) by the OEM, configured in the vehicle sensor device (501) using the pairing tool, or randomly generated. The sensor ID may be a Bluetooth address, a public address, the MAC address, a static random address, or other address of the vehicle sensor device (501). In some embodiments, transmitting (504) at least an identifier (e.g., the identity resolving key (IRK) (505) for a resolvable private address (RPA) to the VCS (503) may be carried out by a wireless tool (e.g., the pairing tool (200) of FIG. 2). For example, the wireless tool may provide the IRK to be used by the vehicle sensor device (501) to the VCS (503).

The method of FIG. 5 also includes communicating (506), by the vehicle sensor device (501), with the VCS (503) using the RPA, wherein the RPA is periodically regenerated by the vehicle sensor device (501). Communicating (506), by the vehicle sensor device (501), with the VCS (503) using the RPA, wherein the RPA is periodically regenerated by the vehicle sensor device (501) may be carried out by the vehicle sensor device (501) sending packets to the VCS (503) via a channel advertised using the RPA. An RPA timeout may cause the controller of the vehicle sensor device (501) to regenerate the RPA to prevent device tracking.

Figure 6:
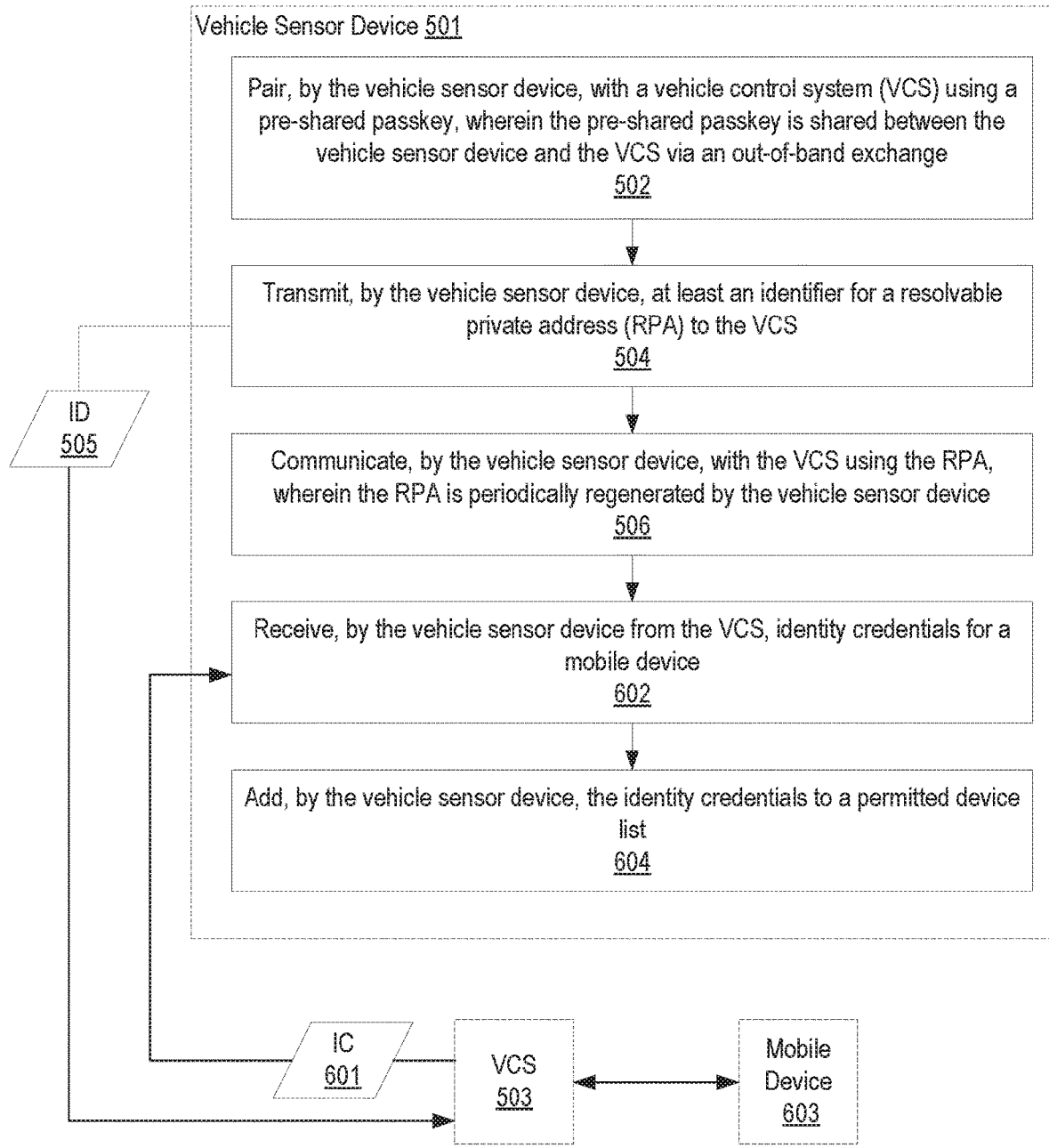
FIG. 6 sets forth a flowchart of another example method for securely pairing a vehicle-mounted wireless sensor with a central device in accordance with the present disclosure.

For further explanation, FIG. 6 sets forth a flow chart illustrating another exemplary method for securely pairing a vehicle-mounted wireless sensor with a central device according to embodiments of the present disclosure. Like the exemplary method of FIG. 5, the method of FIG. 6 also includes pairing (502), by the vehicle sensor device (501), with a vehicle control system (VCS) (503) using a pre-shared passkey, wherein the pre-shared passkey is shared between the vehicle sensor device and the VCS (503) via an out-of-band exchange; transmitting (504), by the vehicle sensor device (501), at least an identifier (e.g., an identity resolving key (IRK)) (505) for a resolvable private address (RPA) to the VCS (503); and communicating (506), by the vehicle sensor device (501), with the VCS (503) using the RPA, wherein the RPA is periodically regenerated by the vehicle sensor device (501).

The method of FIG. 6 differs from the method of FIG. 5 in that the method of FIG. 6 also includes receiving (602), by the vehicle sensor device (501) from the VCS (503), identity credentials (601) for a mobile device (603). Receiving (602), by the vehicle sensor device (501) from the VCS (503), identity credentials (601) for a mobile device (603) may be carried out by the vehicle sensor device (501) receiving a packet from the VCS (503) that includes identity credentials for a mobile device (e.g., a user's smart device such as a smartphone) that has transmitted, to the VCS (503), a request to pair with the vehicle sensor device (501). For example, the identity credentials (601) may include the public address, MAC address, IRK, and/or other identifying information of the mobile device (603). In this example, the VCS (503) has already paired with the mobile device (603) and, as such, has obtained the information for the identify credentials (601) from the mobile device (603).

The method of FIG. 6 also differs from the method of FIG. 5 in that the method of FIG. 6 also includes adding (604), by the vehicle sensor device (501), the identity credentials (601) to a permitted device list. Adding (604), by the vehicle sensor device (501), the identity credentials (601) to the permitted device list may be carried out by the vehicle sensor device (501) storing the identify credentials in a data structure (e.g., a whitelist) that includes identifying information for devices from which the vehicle sensor device (501) will accept connection requests. By filtering the devices from which the vehicle sensor device (501) will accept connection requests, power consumption may be reduced in that the vehicle sensor device (501) does not need to respond to every request from every device, and also enhances the security of the vehicle sensor device (501).

Figure 7:
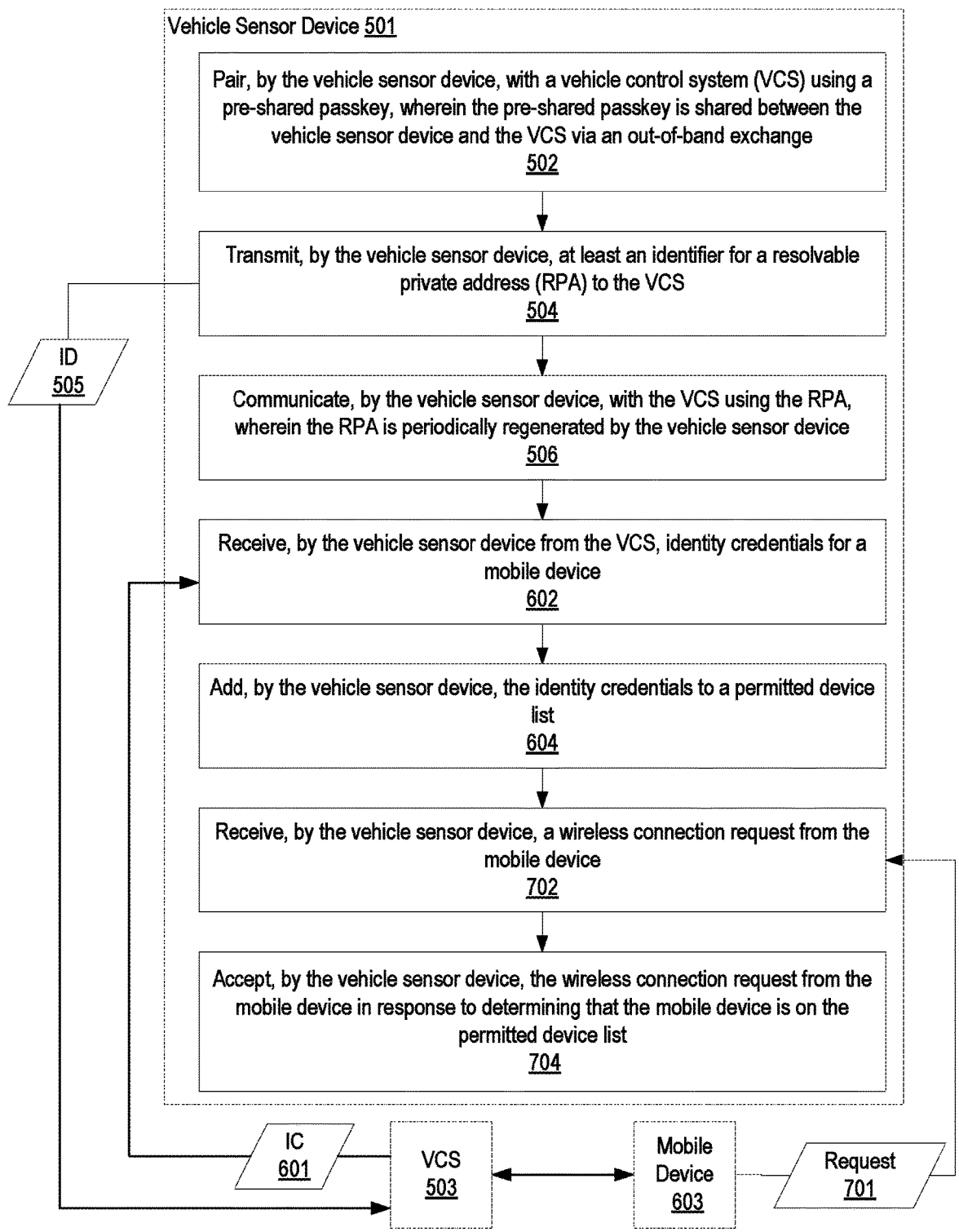
FIG. 7 sets forth a flowchart of another example method for securely pairing a vehicle-mounted wireless sensor with a central device in accordance with the present disclosure.

For further explanation, FIG. 7 sets forth a flow chart illustrating an exemplary method for securely pairing a vehicle-mounted wireless sensor with a central device according to embodiments of the present disclosure. Like the exemplary method of FIG. 6, the method of FIG. 7 also includes pairing (502), by the vehicle sensor device (501), with a vehicle control system (VCS) (503) using a pre-shared passkey, wherein the pre-shared passkey is shared between the vehicle sensor device and the VCS (503) via an out-of-band exchange; transmitting (504), by the vehicle sensor device (501), at least an identifier (e.g., an identity resolving key (IRK) for a resolvable private address (RPA) to the VCS (503); communicating (506), by the vehicle sensor device (501), with the VCS (503) using the RPA, wherein the RPA is periodically regenerated by the vehicle sensor device (501); receiving (602), by the vehicle sensor device (501) from the VCS (503), identity credentials (601) for a mobile device (603); and adding (604), by the vehicle sensor device (501), the identity credentials (601) to a permitted device list.

The method of FIG. 7 differs from the method of FIG. 6 in that the method of FIG. 7 also includes receiving (702) by the vehicle sensor device (501), a wireless connection request (701) from the mobile device (603) of the mobile device (603). Receiving (702) by the vehicle sensor device (501), the wireless connection request (701) from the mobile device (603) may be carried out by the vehicle sensor device (501) receiving a communication request over a channel advertised with identity information of the mobile device (603). For example, the identity information may be a public address, MAC address, RPA, or other address of the mobile device. If the identity information includes an RPA, the RPA may be resolved by applying peer IRKs stored on the vehicle sensor device (501) (e.g., received from the VCS (503). The vehicle sensor device (501) may filter the wireless connection request using the permitted device list to determine whether the vehicle sensor device (501) should accept the wireless connection request (701).

The method of FIG. 7 also differs from the method of FIG. 6 in that the method of FIG. 7 also includes accepting (704), by the vehicle sensor device (501), the wireless connection request (701) from the mobile device (603) in response to determining that the mobile device (603) is on the permitted device list. Accepting (704), by the vehicle sensor device (501), the wireless connection request (701) from the mobile device (603) in response to determining that the mobile device (603) is on the permitted device list may be carried out by the vehicle sensor device (501) determining, based on the identity information of the mobile device (603) and the permitted device list, that the vehicle sensor device (501) may accept the wireless connection request (701) and pair with the mobile device.

In a particular embodiment, the vehicle sensor device (501) includes a TPMS sensor, and the mobile device (603) is a smart device such as a smartphone. The mobile device (603) may pair with the vehicle sensor device to receive tire fill assist data including tire pressure measurements for the purpose of inflating the vehicle tire to the correct pressure.

Figure 8:
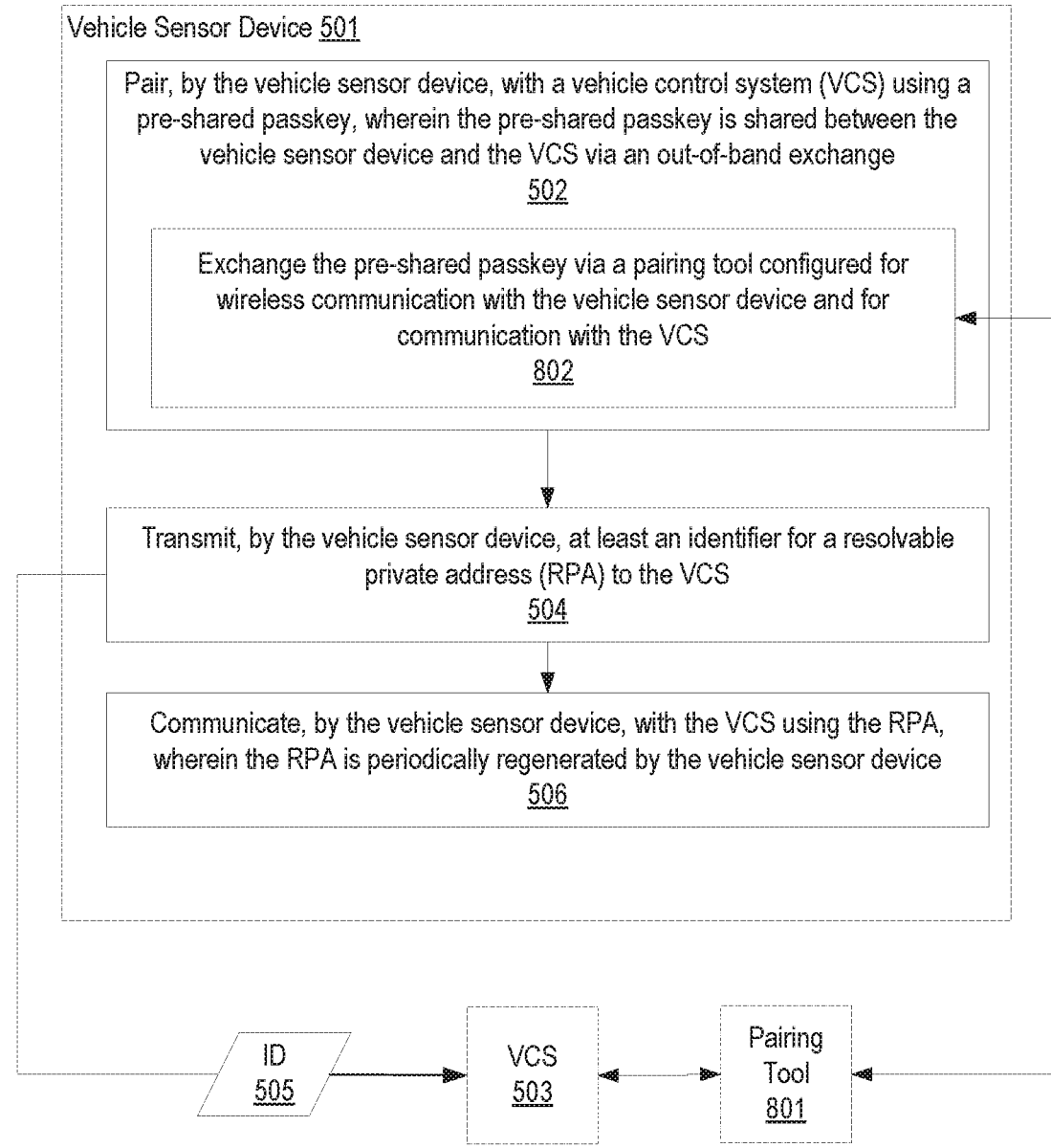
FIG. 8 sets forth a flowchart of another example method for securely pairing a vehicle-mounted wireless sensor with a central device in accordance with the present disclosure.

For further explanation, FIG. 8 sets forth a flow chart illustrating an exemplary method for securely pairing a vehicle-mounted wireless sensor with a central device according to embodiments of the present disclosure. Like the exemplary method of FIG. 5, the method of FIG. 8 also includes pairing (502), by the vehicle sensor device (501), with a vehicle control system (VCS) (503) using a pre-shared passkey, wherein the pre-shared passkey is shared between the vehicle sensor device and the VCS (503) via an out-of-band exchange; transmitting (504), by the vehicle sensor device (501), at least an identifier (505) for a resolvable private address (RPA) to the VCS (503); and communicating (506), by the vehicle sensor device (501), with the VCS (503) using the RPA, wherein the RPA is periodically regenerated by the vehicle sensor device (501).

The method of FIG. 8 differs from the method of FIG. 5 in that pairing (502), by the vehicle sensor device (501), with the VCS (503) using the pre-shared passkey, wherein the pre-shared passkey is shared between the vehicle sensor device and the VCS (503) via an out-of-band exchange, includes exchanging (802) the pre-shared passkey via a pairing tool (801) configured for wireless communication with the vehicle sensor device (501) and for communication with the VCS (503). Exchanging (802) the pre-shared passkey via a pairing tool (801) configured for wireless communication with the vehicle sensor device (501) and for communication with the VCS (503) may be carried out by the vehicle sensor device (501) wirelessly transmitting or receiving the pre-shared passkey to a wireless tool (e.g., the pairing tool (200) of FIG. 2). In an exemplary embodiment, the vehicle sensor device (501) may receive, from the wireless tool, a pre-shared passkey that was generated by the pairing tool, the VCS (503), or another device configured to facilitate the pairing of the vehicle sensor device (501) with the VCS (503). In another exemplary embodiment, the vehicle sensor device (501) may transmit, to the wireless tool, a pre-shared passkey that was generated by the vehicle sensor device (501). In a particular embodiment, the vehicle sensor device (501) may receive the pre-shared passkey from the pairing tool via a BLE transceiver. In other embodiments, the vehicle sensor device (501) may receive the passkey via a low frequency receiver (e.g., via 125 kHz signal), a low power receiver (e.g., via a 2.4 GHz signal), Near Field Communication (NFC), or Radio Frequency Identification (RFID).

Figure 9:
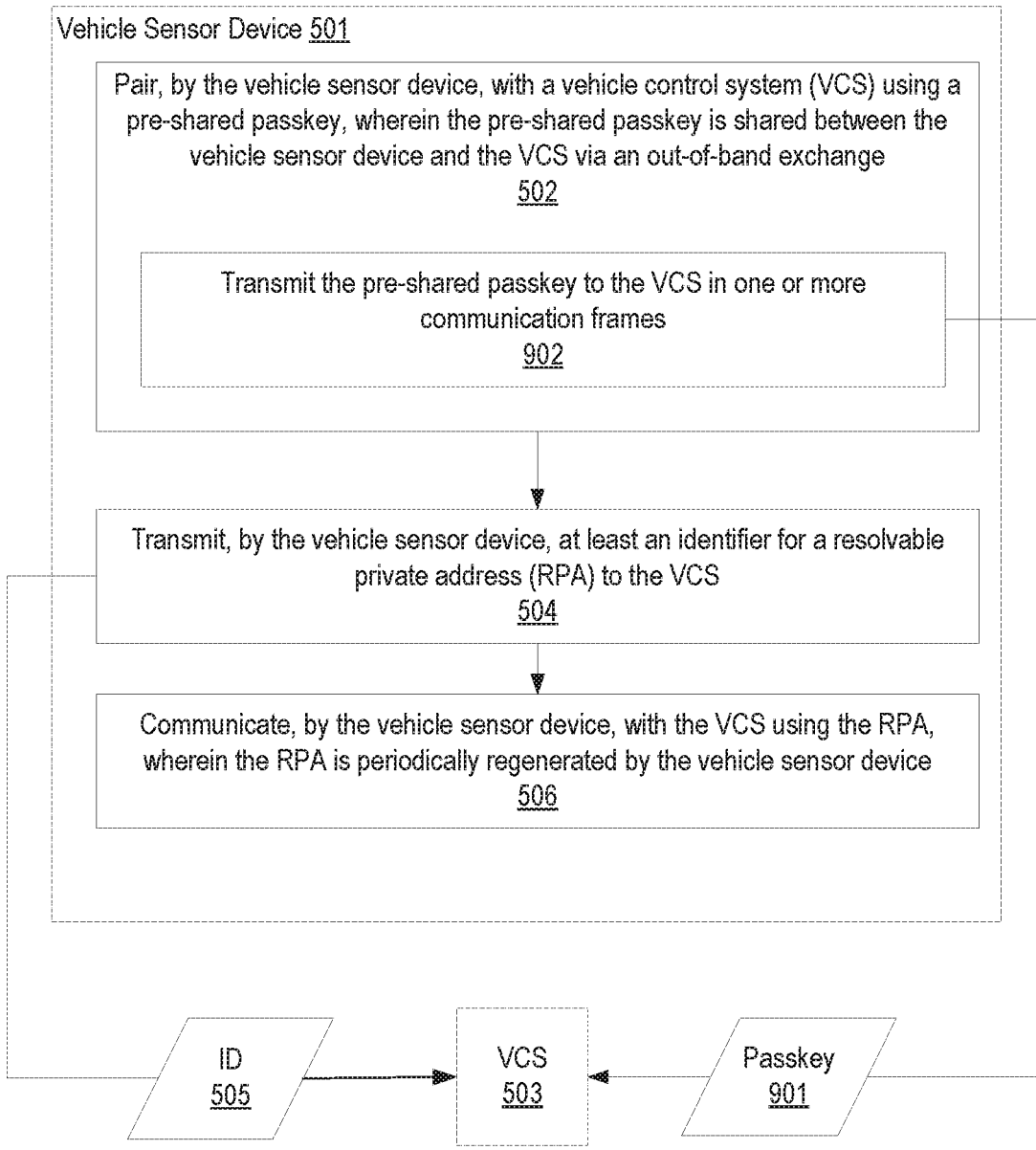
FIG. 9 sets forth a flowchart of another example method for securely pairing a vehicle-mounted wireless sensor with a central device in accordance with the present disclosure.

For further explanation, FIG. 9 sets forth a flow chart illustrating an exemplary method for securely pairing a vehicle-mounted wireless sensor with a central device according to embodiments of the present disclosure. Like the exemplary method of FIG. 5, the method of FIG. 9 also includes pairing (502), by the vehicle sensor device (501), with a vehicle control system (VCS) (503) using a pre-shared passkey, wherein the pre-shared passkey is shared between the vehicle sensor device and the VCS (503) via an out-of-band exchange; transmitting (504), by the vehicle sensor device (501), at least an identifier (505) for a resolvable private address (RPA) to the VCS (503); and communicating (506), by the vehicle sensor device (501), with the VCS (503) using the RPA, wherein the RPA is periodically regenerated by the vehicle sensor device (501).

The method of FIG. 9 also differs from the method of FIG. 5 in that pairing (502), by the vehicle sensor device (501), with the VCS (503) using the pre-shared passkey, wherein the pre-shared passkey is shared between the vehicle sensor device and the VCS (503) via an out-of-band exchange, includes transmitting (902) the pre-shared passkey (901) to the VCS (503) in one or more communication frames. Transmitting (902) the pre-shared passkey to the VCS (503) in one or more communication frames may be carried out by the vehicle sensor device (501) transmitting a packet to the VCS (503) over a communication channel advertised with the sensor ID of the vehicle sensor device (501) as part of the initial communication between the vehicle sensor device (501) and the VCS (503). For example, the pre-shared passkey may be transmitted in one or more initial communication frames so that the VCS (503) may identify the vehicle sensor device (501) based on the pre-shared passkey.

Figure 10:
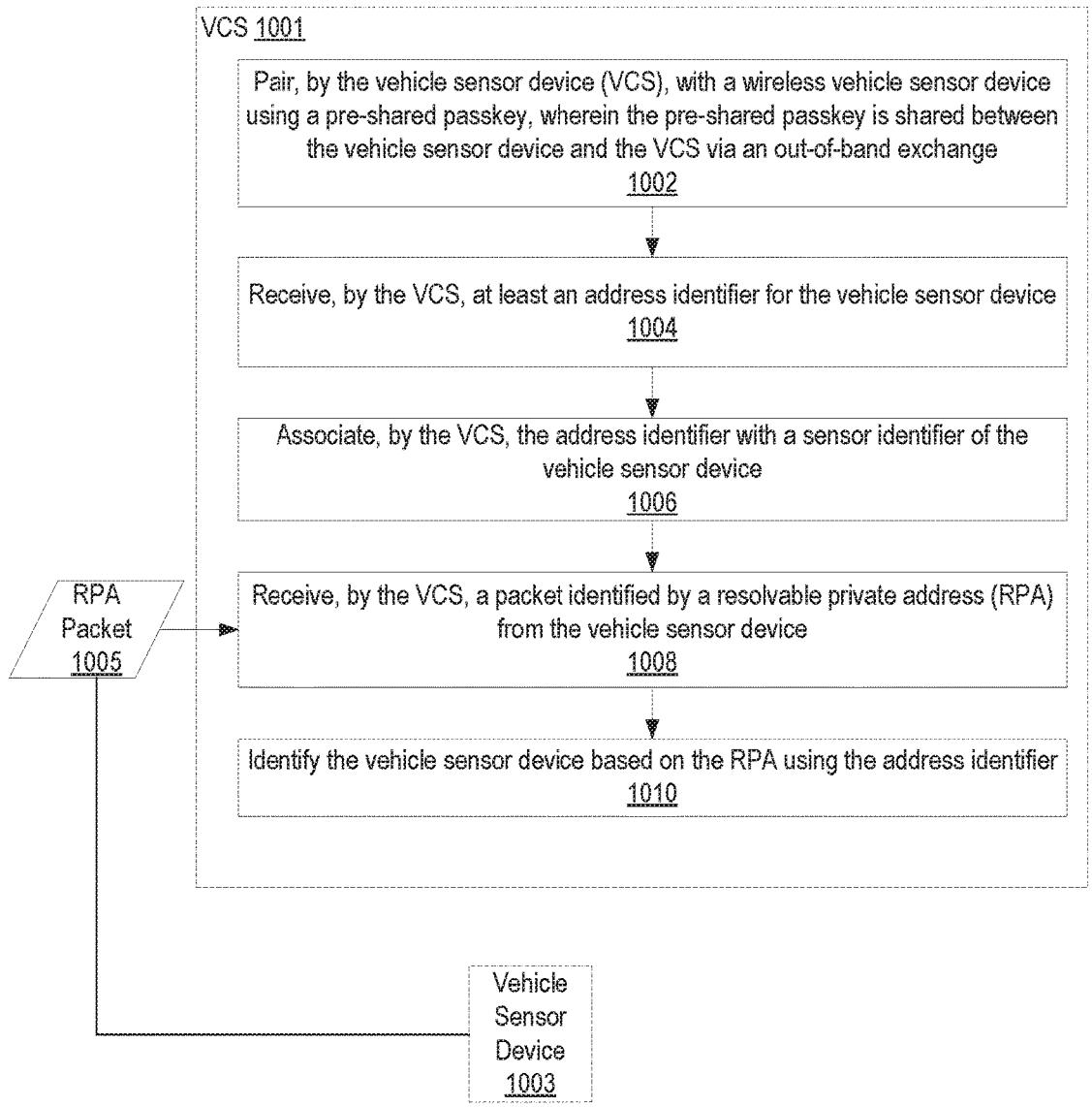
FIG. 10 sets forth a flowchart of another example method for securely pairing a vehicle-mounted wireless sensor with a central device in accordance with the present disclosure.

For further explanation, FIG. 10 sets forth a flow chart illustrating an exemplary method for securely pairing a vehicle-mounted wireless sensor with a central device according to embodiments of the present disclosure that includes pairing (1002), by the vehicle sensor device (VCS) (1001), with a wireless vehicle sensor device (1003) using a pre-shared passkey, wherein the pre-shared passkey is shared between the vehicle sensor device (1003) and the VCS (1001) via an out-of-band exchange. Pairing (1002), by the vehicle sensor device (VCS) (1001), with a wireless vehicle sensor device (1003) using a pre-shared passkey, wherein the pre-shared passkey is shared between the vehicle sensor device (1003) and the VCS (1001) via an out-of-band exchange may be carried out by the vehicle sensor device (1003) and the VCS (1001) exchanging a pre-shared passkey via an external device that is configured for communication with both the vehicle sensor device (1003) and the VCS (1001). For example, before communication is initiated between the vehicle sensor device (1003) and the VCS (1001), a device (e.g., the pairing tool (200) of FIG. 2) that is not a component of the vehicle may distribute the pre-shared passkey via a wireless connection to the vehicle sensor device (1003) and a wired or wireless connection to the VCS (1001).

The method of FIG. 10 also includes receiving (1004), by the VCS (1001), at least an address identifier (e.g., an identity resolving key (IRK)) for the vehicle sensor device (1003). Receiving (1004), by the VCS (1001), at least address identifier for the vehicle sensor device (1003) may be carried out by the VCS (1001) receiving a packet containing an IRK transmitted by the vehicle sensor device (1003). In some examples, the VCS (1001) receives the IRK via a wireless tool (e.g., the pairing tool (200) of FIG. 2).

The method of FIG. 10 also includes associating (1006), by the VCS (1001), the address identifier with a sensor identifier of the vehicle sensor device (1003). Associating (1006), by the VCS (1001) the address identifier with a sensor identifier of the vehicle sensor device (1003) may be carried out by the VCS (1001) storing the IRK and associated sensor identifier of the vehicle sensor device (1003) in a data structure.

The method of FIG. 10 also includes receiving (1008), by the VCS (1001), a packet (1005) identified by a resolvable private address (RPA) from the vehicle sensor device (1003). Receiving (1008), by the VCS (1001), a packet (1005) identified by the RPA from the vehicle sensor device (1003) may be carried out by the VCS (1001) receiving the packet (1005) from the vehicle sensor device (1003) over a communication channel advertised with the RPA of the vehicle sensor device (1003)

The method of FIG. 10 also includes identifying (1010), by the VCS (1001), the vehicle sensor device (1003) from the RPA using the address identifier. Identifying (1010), by the VCS (1001), the vehicle sensor device (1003) from the RPA using the address identifier may be carried out by the VCS (1001) computing a hash of an RPA using the address identifier (e.g., an IRK) and an encryption function to resolve the sensor identifier associated with the vehicle sensor device (1003).

Figure 11:
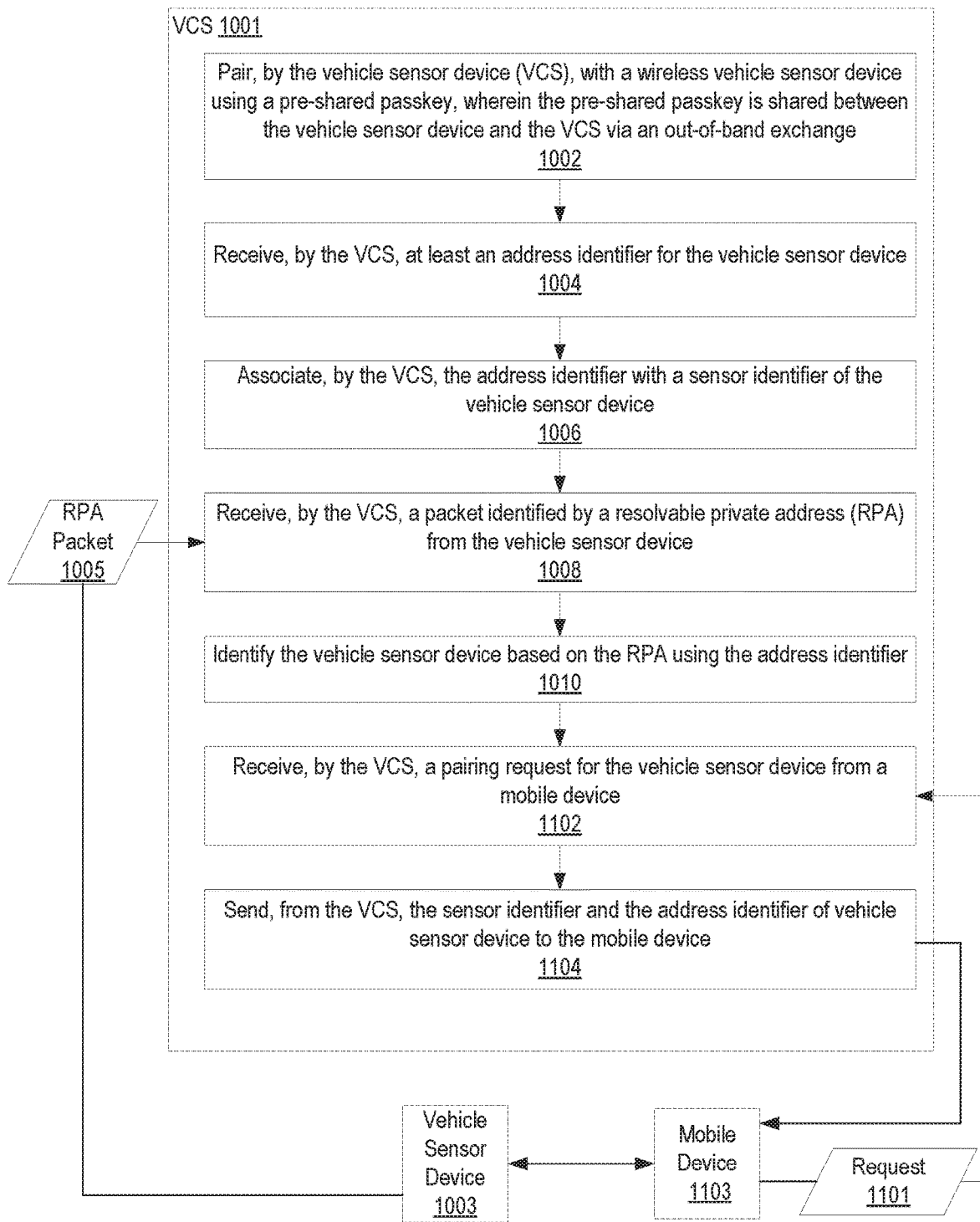
FIG. 11 sets forth a flowchart of another example method for securely pairing a vehicle-mounted wireless sensor with a central device in accordance with the present disclosure.

For further explanation, FIG. 11 sets forth a flow chart illustrating an exemplary method for securely pairing a vehicle-mounted wireless sensor with a central device according to embodiments of the present disclosure. Like the exemplary method of FIG. 10, the method of FIG. 11 also includes pairing (1002), by the vehicle sensor device (VCS) (1001), with a wireless vehicle sensor device (1003) using a pre-shared passkey, wherein the pre-shared passkey is shared between the vehicle sensor device (1003) and the VCS (1001) via an out-of-band exchange; receiving (1004), by the VCS (1001), at least an address identifier for the vehicle sensor device (1003); associating (1006), by the VCS (1001), the address identifier with a sensor identifier of the vehicle sensor device (1003); receiving (1008), by the VCS (1001), a packet (1005) identified by a resolvable private address (RPA) from the vehicle sensor device (1003); and identifying (1010), by the VCS (1001), the vehicle sensor device (1003) from the RPA using the address identifier.

The method of FIG. 11 differs from the method of FIG. 10 in that the method of FIG. 11 also includes receiving (1102), by the VCS (1001), a pairing request (1101) for the vehicle sensor device (1003) from a mobile device (1103). Receiving (1102), by the VCS (1001), the pairing request (1101) for the vehicle sensor device (1003) from the mobile device (1103) may be carried out by the VCS (1001) receiving a request from a mobile device (1103) (e.g., a user's smart device such as a smart phone) for identity information for communicating with a particular vehicle sensor device (1003). For example, the mobile device (1103) may be a device that is already paired (e.g., via a Bluetooth connection) with the VCS (1001) such that the VCS (1001) has already recorded identity information for the mobile device (e.g., Bluetooth address, device address, public address, IRK, etc.). In a particular embodiment, the vehicle sensor device (1003) may include a TPMS sensor, and the mobile device (1103) may be a smart device such as a smartphone. The mobile device (1103) may pair with the vehicle sensor device (1003) to receive tire fill assist data including tire pressure measurements for the purpose of inflating the vehicle tire to the correct pressure.

The method of FIG. 11 also differs from the method of FIG. 10 in that the method of FIG. 11 also includes sending (1104), from the VCS (1001), the sensor identifier and the address identifier (e.g., the IRK) of vehicle sensor device (1003) to the mobile device (1103). Sending (1104), from the VCS (1001), the sensor identifier and the address identifier of vehicle sensor device (1003) to the mobile device (1103) may be carried out by the VCS (1001) identifying the stored IRK and other identifying information of the vehicle sensor device (1003) and transmitting (e.g., via the Bluetooth connection) the IRK and other identifying information to the mobile device (1103).

Figure 12:
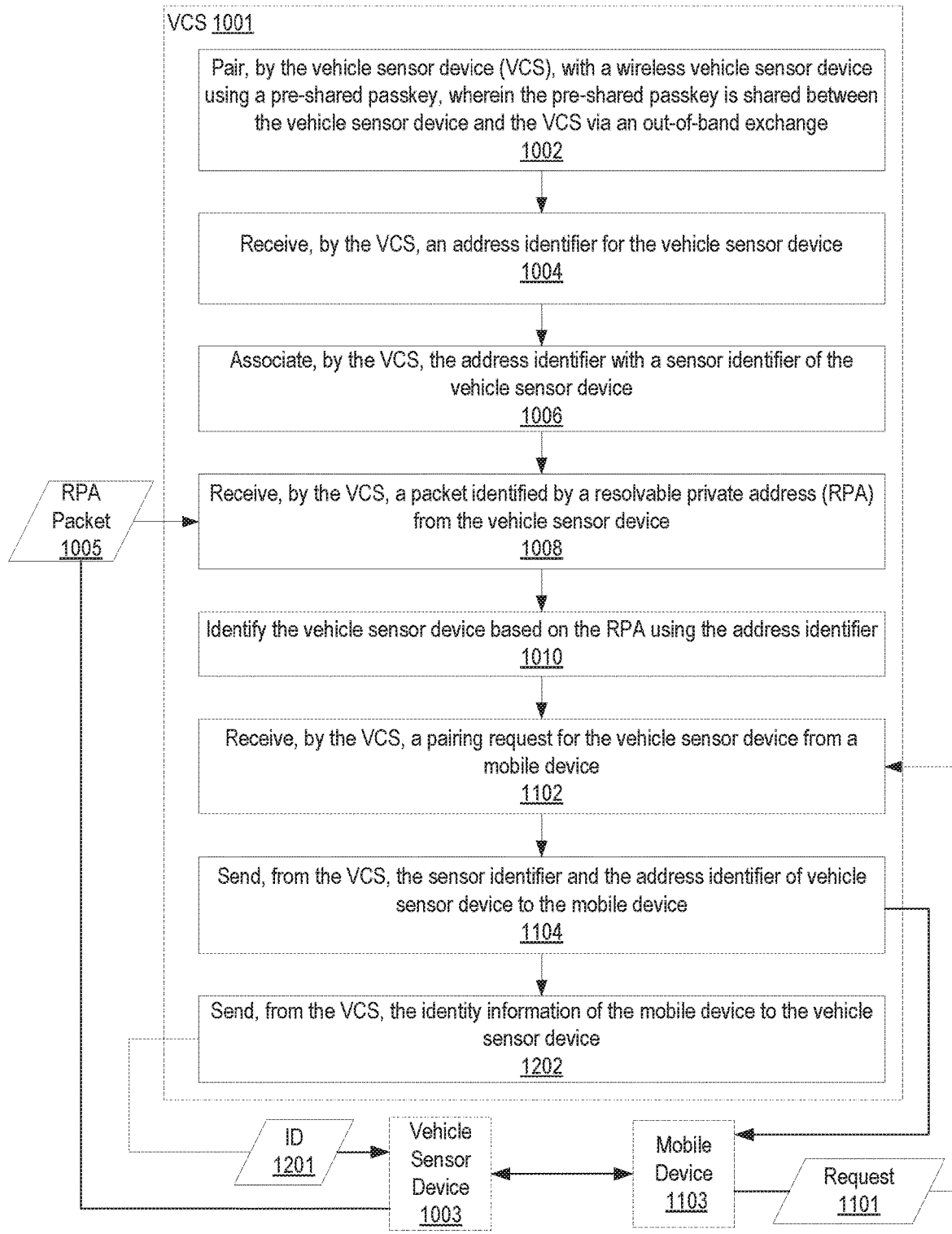
FIG. 12 sets forth a flowchart of another example method for securely pairing a vehicle-mounted wireless sensor with a central device in accordance with the present disclosure.

For further explanation, FIG. 12 sets forth a flow chart illustrating an exemplary method for securely pairing a vehicle-mounted wireless sensor with a central device according to embodiments of the present disclosure. Like the exemplary method of FIG. 11, the method of FIG. 12 also includes pairing (1002), by the vehicle sensor device (VCS) (1001), with a wireless vehicle sensor device (1003) using a pre-shared passkey, wherein the pre-shared passkey is shared between the vehicle sensor device (1003) and the VCS (1001) via an out-of-band exchange; receiving (1004), by the VCS (1001), at least an address identifier for the vehicle sensor device (1003); associating (1006), by the VCS (1001), the address identifier with a sensor identifier of the vehicle sensor device (1003); receiving (1008), by the VCS (1001), a packet (1005) identified by a resolvable private address (RPA) from the vehicle sensor device (1003); and identifying (1010), by the VCS (1001), the vehicle sensor device (1003) from the RPA using the address identifier; receiving (1102), by the VCS (1001), a pairing request (1101) for the vehicle sensor device (1003) from a mobile device (1103); and sending (1104), from the VCS (1001), the sensor identifier and the address identifier of vehicle sensor device (1003) to the mobile device (1103).

The method of FIG. 12 differs from the method of FIG. 11 in that the method of FIG. 12 also includes sending (1202), from the VCS (1001), the identity information (1201) of the mobile device (1103) to the vehicle sensor device (1003). Sending (1202), from the VCS (1001), the identity information (1201) of the mobile device (1103) to the vehicle sensor device (1003) may be carried out by the VCS (1001) transmitting a stored public address, device address, IRK, or other identifying information corresponding to the mobile device (1103) to the vehicle sensor device (1003). The identifying information (1201) may be credentialed identity information of the mobile device (1103) in that it is transmitted by the VCS (1001), which has already paired with the mobile device (1103). For example, the VCS (1001) may transmit a configuration parameter to the vehicle sensor device (1003) such that the identity information of the mobile device (1103) is added to a permitted device list (i.e., whitelist) of the vehicle sensor device (1003).

Figure 13:
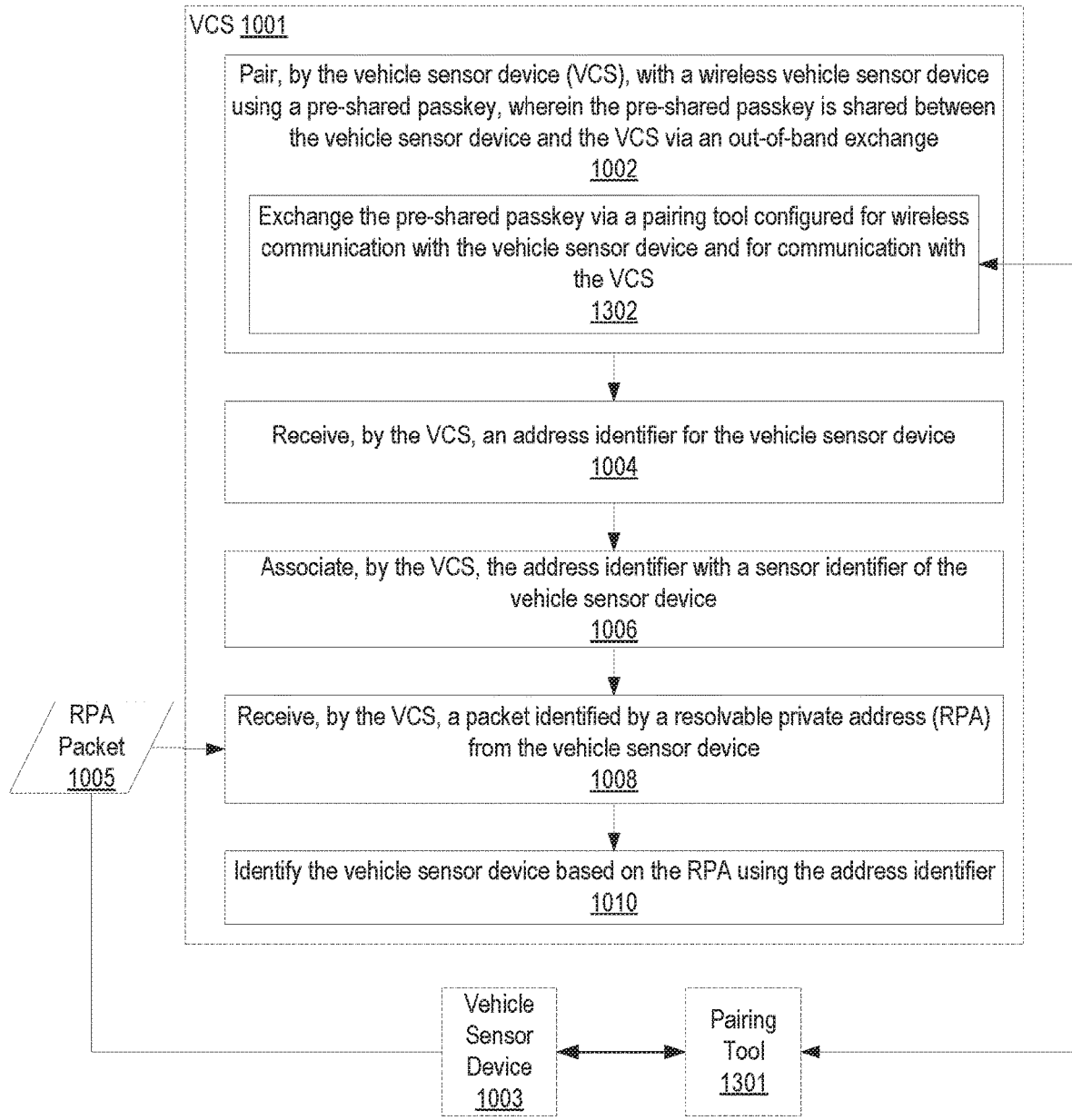
FIG. 13 sets forth a flowchart of another example method for securely pairing a vehicle-mounted wireless sensor with a central device in accordance with the present disclosure.

For further explanation, FIG. 13 sets forth a flow chart illustrating an exemplary method for securely pairing a vehicle-mounted wireless sensor with a central device according to embodiments of the present disclosure. Like the exemplary method of FIG. 10, the method of FIG. 13 also includes pairing (1002), by the vehicle sensor device (VCS) (1001), with a wireless vehicle sensor device (1003) using a pre-shared passkey, wherein the pre-shared passkey is shared between the vehicle sensor device (1003) and the VCS (1001) via an out-of-band exchange; receiving (1004), by the VCS (1001), at least an address identifier for the vehicle sensor device (1003); associating (1006), by the VCS (1001), the address identifier with a sensor identifier of the vehicle sensor device (1003); receiving (1008), by the VCS (1001), a packet (1005) identified by a resolvable private address (RPA) from the vehicle sensor device (1003); and identifying (1010), by the VCS (1001), the vehicle sensor device (1003) from the RPA using the address identifier.

The method of FIG. 13 differs from the method of FIG. 10 in that pairing (1002), by the vehicle sensor device (VCS) (1001), with a wireless vehicle sensor device (1003) using a pre-shared passkey, wherein the pre-shared passkey is shared between the vehicle sensor device (1003) and the VCS (1001) via an out-of-band exchange includes exchanging (1302) the pre-shared passkey via a pairing tool (1301) configured for wireless communication with the vehicle sensor device (1003) and for communication with the VCS (1001). Exchanging (1302) the pre-shared passkey via the pairing tool (1301) configured for wireless communication with the vehicle sensor device (1003) and for communication with the VCS (1001) may be carried out by the VCS (1001) communicating with a wireless tool (e.g., the pairing tool (200) of FIG. 2) to transmit or receive the pre-shared passkey. In an exemplary embodiment, the VCS (1001) may receive, from the wireless tool, a pre-shared passkey that was generated by the pairing tool, the vehicle sensor device (1003), or another device configured to facilitate the pairing of the vehicle sensor device (1003) with the VCS (1001). In some embodiments, the VCS (1001) also receives, from the wireless tool, the IRK used by the vehicle sensor device (1003). In another exemplary embodiment, the VCS (1001) may transmit, to the wireless tool, a pre-shared passkey that was generated by the VCS (501). In a particular embodiment, the VCS (1001) may transmit the pre-shared passkey to the pairing tool via a BLE transceiver. In other embodiments, the VCS (1001) may transmit the passkey via a wired connection to the VCS (1001), such as a CAN interface of the VCS (1001). In yet another embodiment, the pre-shared passkey may be a security parameter of the VCS (1001) provided to the pairing tool.

Figure 14:
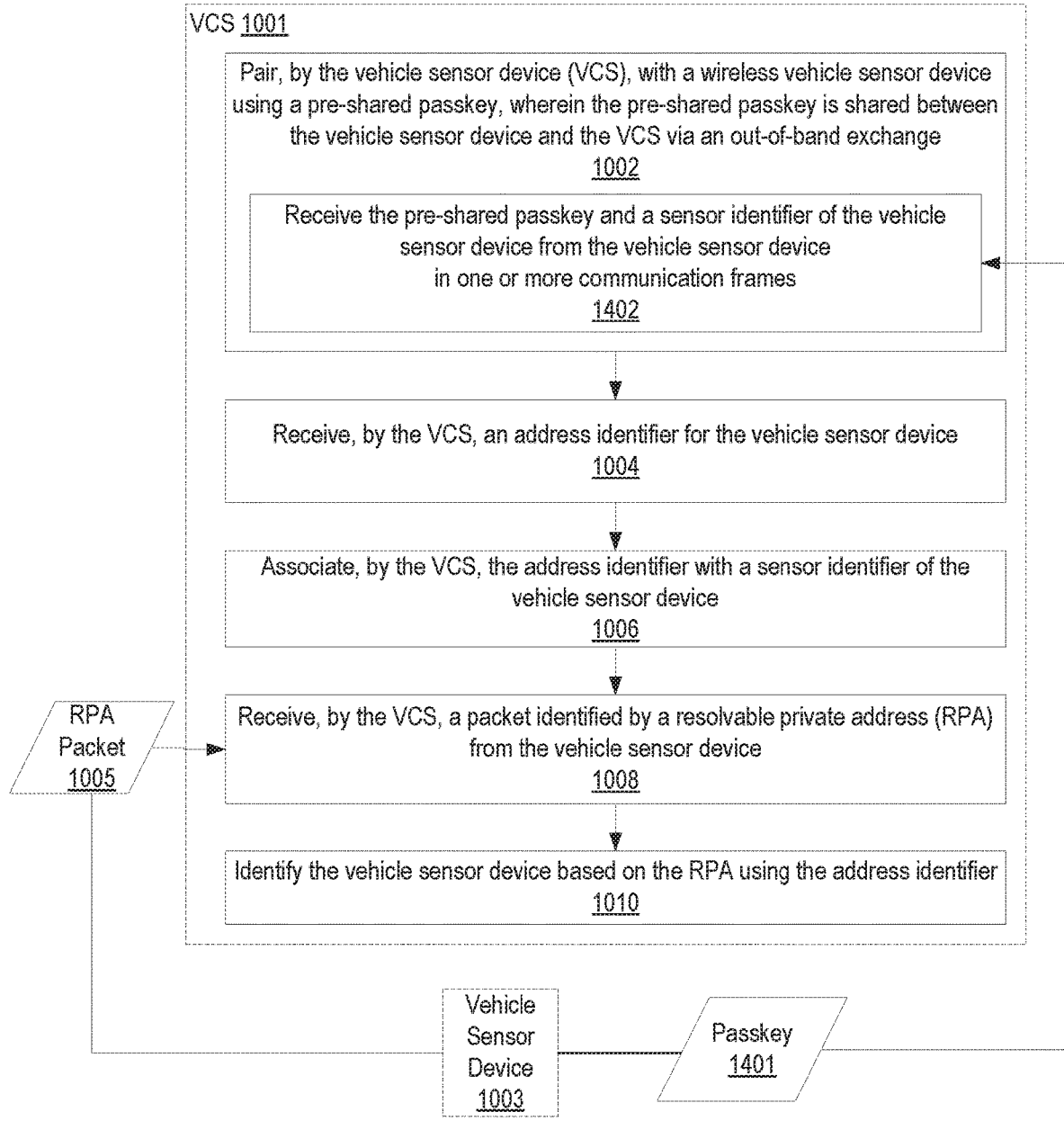
FIG. 14 sets forth a flowchart of another example method for securely pairing a vehicle-mounted wireless sensor with a central device in accordance with the present disclosure.

For further explanation, FIG. 14 sets forth a flow chart illustrating an exemplary method for securely pairing a vehicle-mounted wireless sensor with a central device according to embodiments of the present disclosure. Like the exemplary method of FIG. 10, the method of FIG. 14 also includes pairing (1002), by the vehicle sensor device (VCS) (1001), with a wireless vehicle sensor device (1003) using a pre-shared passkey, wherein the pre-shared passkey is shared between the vehicle sensor device (1003) and the VCS (1001) via an out-of-band exchange; receiving (1004), by the VCS (1001), at least address identifier for the vehicle sensor device (1003); associating (1006), by the VCS (1001), the address identifier with a sensor identifier of the vehicle sensor device (1003); receiving (1008), by the VCS (1001), a packet (1005) identified by a resolvable private address (RPA) from the vehicle sensor device (1003); and identifying (1010), by the VCS (1001), the vehicle sensor device (1003) from the RPA using the address identifier.

The method of FIG. 14 differs from the method of FIG. 10 in that pairing (1002), by the vehicle sensor device (VCS) (1001), with a wireless vehicle sensor device (1003) using a pre-shared passkey, wherein the pre-shared passkey is shared between the vehicle sensor device (1003) and the VCS (1001) via an out-of-band exchange includes receiving (1402) the pre-shared passkey from the vehicle sensor device (1003) in one or more communication frames. Receiving (1402) the pre-shared passkey (1401) from the vehicle sensor device (1003) in an initial communication frame may be carried out by the vehicle sensor device (1003) transmitting a packet to the VCS (1001) over a communication channel advertised with the sensor ID of the vehicle sensor device (1003) as part of the initial communication between the vehicle sensor device (1003) and the VCS (1001). For example, the pre-shared passkey (1401) may be transmitted in one or more initial communication frames so that the VCS (1001) may identify the vehicle sensor device (1003) based on the pre-shared passkey.

In view of the explanations set forth above, readers will recognize that the benefits of securely pairing a vehicle-mounted wireless sensor with a central device according to embodiments of the present disclosure include, but are not limited to:

- The wireless vehicle sensor may be securely paired to the vehicle control system using an out-of-band interface that does not require a physical or display interface on the vehicle sensor;
- Direct pairing of a user's smart device with the wireless vehicle sensor, even when the sensor uses a private address, is accomplished by sharing the sensor pairing information between the vehicle control system and the user's smart device;
- A user's smart device may initiate bidirectional communication with the wireless vehicle sensor based on the sensor pairing information obtained via the vehicle control system;
- Power consumption in the wireless vehicle sensor may be reduced by filtering connection requests according to whitelisted devices.

Exemplary embodiments of the present invention are described largely in the context of a fully functional computer system for securely pairing a vehicle-mounted wireless sensor with a central device. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for securely pairing a vehicle-mounted wireless sensor with a central device, the method comprising:
   pairing, by a vehicle sensor device, with a vehicle control system (VCS) using a pre-shared passkey, wherein the pre-shared passkey is shared between the vehicle sensor device and the VCS via an out-of-band exchange;
   transmitting, by the vehicle sensor device, an identifier for a resolvable private address (RPA) to the VCS; and
   communicating, by the vehicle sensor device, with the VCS using the RPA, wherein the RPA is periodically regenerated by the vehicle sensor device.

2. The method of claim 1, further comprising:
   receiving, by the vehicle sensor device from the VCS, identity credentials for a mobile device; and
   adding, by the vehicle sensor device, the identity credentials to a permitted device list.

3. The method of claim 2, further comprising:
   receiving by the vehicle sensor device, a wireless connection request from the mobile device; and accepting, by the vehicle sensor device, the wireless connection request from the mobile device in response to determining that the mobile device is on the permitted device list.

4. The method of claim 3, wherein the wireless connection request is directed to the RPA of the wireless vehicle sensor device using the identifier provided to the mobile device by the VCS.

5. The method of claim 3, wherein the vehicle sensor device includes a tire pressure monitoring system (TPMS) sensor, and wherein the vehicle sensor device transmits tire fill assist data to the mobile device.

6. The method of claim 1, wherein pairing, by the vehicle sensor device, with the vehicle control system (VCS) using the pre-shared passkey, wherein the pre-shared passkey is shared between the vehicle sensor device and the VCS via an out-of-band exchange, includes exchanging the pre-shared passkey via a pairing tool configured for wireless communication with the vehicle sensor device and for communication with the VCS.

7. The method of claim 1, wherein pairing, by the vehicle sensor device, with the vehicle control system (VCS) using the pre-shared passkey, wherein the pre-shared passkey is shared between the vehicle sensor device and the VCS via an out-of-band exchange, includes transmitting the pre-shared passkey to the VCS in one or more communication frames.

8. The method of claim 1, wherein the pre-shared key is at least one of a randomly generated code and a VCS-supplied security parameter.

9. The method of claim 1, wherein the vehicle sensor device is a Bluetooth-enabled device.

10. The method of claim 1, wherein the vehicle sensor device is a tire pressure monitoring system device.

11. A wireless vehicle sensor device for securely pairing a vehicle-mounted wireless sensor with a central device, comprising:
a transceiver configured for bidirectional communication; and
a controller configured to:
pair, via the transceiver, with a vehicle control system (VCS) using a pre-shared passkey, wherein the pre-shared passkey is shared between the vehicle sensor device and the VCS via an out-of-band exchange;
transmit, via the transceiver, an identifier for a resolvable private address (RPA) to the VCS; and
communicate, via the transceiver, by the vehicle sensor device, with the VCS using the RPA, wherein the RPA is periodically regenerated by the vehicle sensor device.

12. A method for securely pairing a vehicle-mounted wireless sensor with a central device, the method comprising:
pairing, by a vehicle control system (VCS), with a wireless vehicle sensor device using a pre-shared passkey, wherein the pre-shared passkey is shared between the vehicle sensor device and the VCS via an out-of-band exchange;
receiving, by the VCS, at least an address identifier for the vehicle sensor device;
associating, by the VCS, the address identifier with a sensor identifier of the vehicle sensor device;
receiving, by the VCS, a packet identified by a resolvable private address (RPA) from the vehicle sensor device; and
identifying the vehicle sensor device based on the RPA using the address identifier.

13. The method of claim 12, further comprising:
receiving, by the VCS, a pairing request for the vehicle sensor device from a mobile device; and
sending, from the VCS, the sensor identifier and the address identifier of the vehicle sensor device to the mobile device.

14. The method of claim 13, further comprising:
sending, from the VCS, the identity information of the mobile device to the vehicle sensor device.

15. The method of claim 12, wherein pairing, by the vehicle control system (VCS), with the wireless vehicle sensor device using the pre-shared passkey, wherein the pre-shared passkey is shared between the vehicle sensor device and the VCS via an out-of-band exchange, includes exchanging the pre-shared passkey via a pairing tool configured for wireless communication with the vehicle sensor device and for communication with the VCS.

16. The method of claim 12, wherein pairing, by the vehicle control system (VCS), with the wireless vehicle sensor device using the pre-shared passkey, wherein the pre-shared passkey is shared between the vehicle sensor device and the VCS via an out-of-band exchange, includes receiving the pre-shared passkey and a sensor identifier of the vehicle sensor device from the vehicle sensor device in one or more communication frames.

17. The method of claim 12, wherein the pre-shared key is at least one of a randomly generated code and a VCS-supplied security parameter.

18. The method of claim 12, wherein the vehicle sensor device is a Bluetooth-enabled device.

19. The method of claim 12, wherein the vehicle sensor device is a tire pressure monitoring system device.

20. A vehicle control system for securely pairing a vehicle-mounted wireless sensor with a central device, comprising:
a transceiver configured for bidirectional communication;
a memory; and
a controller configured to:
pair, via the transceiver, with a wireless vehicle sensor device using a pre-shared passkey, wherein the pre-shared passkey is shared between the vehicle sensor device and the VCS via an out-of-band exchange;
receive, via the transceiver, an address identifier for the vehicle sensor device;
associate, in a data structure store in the memory, the address identifier with a sensor identifier of the vehicle sensor device;
receive, via the transceiver, a packet identified by a resolvable private address (RPA) from the vehicle sensor device; and
identify the vehicle sensor device based on the RPA using the address identifier.

* * * * *